(12) United States Patent
Lee

(10) Patent No.: US 11,024,156 B2
(45) Date of Patent: Jun. 1, 2021

(54) PRECISE PREDICTIVE MAINTENANCE METHOD FOR DRIVING UNIT

(71) Applicant: ITS CO., LTD., Ulsan (KR)

(72) Inventor: Young Kyu Lee, Ulsan (KR)

(73) Assignee: ITS CO., LTD., Ulsan (KR)

( * ) Notice: Subject to any disclaimer, the term of this patent is extended or adjusted under 35 U.S.C. 154(b) by 0 days.

(21) Appl. No.: 17/019,297

(22) Filed: Sep. 13, 2020

(65) Prior Publication Data

US 2020/0410849 A1 Dec. 31, 2020

Related U.S. Application Data

(63) Continuation of application No. PCT/KR2018/015288, filed on Dec. 4, 2018.

(30) Foreign Application Priority Data

Mar. 14, 2018 (KR) .................. 10-2018-0029596

(51) Int. Cl.
G08B 29/26 (2006.01)
G08B 31/00 (2006.01)
G08B 21/18 (2006.01)

(52) U.S. Cl.
CPC ........... *G08B 31/00* (2013.01); *G08B 21/182* (2013.01)

(58) Field of Classification Search
CPC ...... A61H 2201/5071; A61H 2230/045; A61H 2230/065; A61H 2230/206; A61H 2230/208; A61H 2230/305; A61H 2230/405; A61H 31/005; A61H 31/006; A61H 31/007; A61M 16/0051; A61M 16/0066; A61M 16/024; A61M 16/0833; A61M 16/085; A61M 16/125; A61M 16/127; A61M 16/204; A61M 16/205; A61M 2016/0021; A61M 2016/0027;
(Continued)

(56) References Cited

U.S. PATENT DOCUMENTS 5,815,070 A * 9/1998 Yoshikawa ............ G08B 21/06
180/272
7,010,468 B2 3/2006 Gotkis et al.
(Continued)

FOREIGN PATENT DOCUMENTS

CN 1435837 A 8/2003
CN 102274031 A 12/2011
(Continued)

OTHER PUBLICATIONS

International Search Report issued in PCT/KR2018/015288; dated Mar. 12, 2019.
(Continued)

*Primary Examiner* — Daniel Previl
(74) *Attorney, Agent, or Firm* — Studebaker & Brackett PC

(57) ABSTRACT

The present invention relates to a precise predictive maintenance method for a driving unit and a configuration thereof includes a first base information collecting step S10 of dividing change information of an energy size, a second base information collecting step S20 of connecting a peak interval between a highest point and a lowest point of a driving period in a driving state of the driving unit; a setting step S30 of setting an alarm gradient value, and a detecting step S40 of detecting the driving unit as an abnormal state.

5 Claims, 19 Drawing Sheets

(58) Field of Classification Search
CPC .. A61M 2016/0036; A61M 2016/0039; A61M 2016/0042; A61M 2016/1025; A61M 2016/103; A61M 2202/0208; A61M 2205/054; A61M 2205/18; A61M 2205/35; A61M 2205/502; A61M 2205/581; A61M 2205/583; A61M 2205/8206; A61M 2230/04; A61M 2230/10; A61M 2230/202; A61M 2230/205; A61M 2230/30; A61M 2230/432; A61M 2230/435; A61M 2230/60; A61N 1/39; A61N 1/39044; A61N 1/3987; G01M 13/00; G01M 99/002; G01N 2203/0071; G01N 2203/0222; G01N 3/18; G01N 3/32; G01N 3/60; G05B 23/0221; G05B 23/0235; G05B 23/0283
USPC ...... 340/511, 506, 515, 521, 538.12, 539.22, 340/568.1, 636.11, 683, 686.1, 692, 3.44
See application file for complete search history.

(56) References Cited

U.S. PATENT DOCUMENTS

| | | | |
|---|---|---|---|
| 2003/0141997 | A1 | 7/2003 | Kawabe et al. |
| 2009/0316748 | A1* | 12/2009 | Wawrzonek ............. G01N 3/18 374/46 |
| 2011/0264325 | A1 | 10/2011 | McLaughlin et al. |
| 2014/0219071 | A1* | 8/2014 | Takata .................. G11B 27/36 369/53.1 |
| 2015/0328417 | A1* | 11/2015 | Loser .................. A61M 16/024 128/204.23 |

FOREIGN PATENT DOCUMENTS

| | | |
|---|---|---|
| CN | 104574848 A | 4/2015 |
| CN | 105808557 A | 7/2016 |
| CN | 106645870 A | 5/2017 |
| JP | 2003-280707 A | 10/2003 |
| JP | 2010-166686 A | 7/2010 |
| JP | 2012-083721 A | 4/2012 |
| KR | 10-0856301 B1 | 9/2008 |
| KR | 10-1643599 B1 | 7/2016 |

OTHER PUBLICATIONS

An Office Action mailed by China National Intellectual Property Administration dated Feb. 3, 2021, which corresponds to Chinese Patent Application No. 201880091159.5 and is related to U.S. Appl. No. 17/019,297; with English language Concise Explanation.

* cited by examiner

PRECISE PREDICTIVE MAINTENANCE METHOD FOR DRIVING UNIT

CROSS-REFERENCE TO RELATED APPLICATIONS

The present application is a continuation of International Patent Application No. PCT/KR2018/015288, filed on Dec. 4, 2018, which is based upon and claims the benefit of priority to Korean Patent Application No. 10-2018-0029596, filed on Mar. 14, 2018. The disclosures of the above-listed applications are hereby incorporated by reference herein in their entirety.

TECHNICAL FIELD

The present invention relates to a precise predictive maintenance method for a driving unit, and more particularly, to a precise predictive maintenance method for a driving unit which measures and collects a peak interval, a mean value, and a median value between a highest point and a lowest point of a driving period from driving information of a driving unit in a normal state and driving information of the driving unit before a malfunction is generated and sets an alarm upper limit and an alarm lower limit for the peak interval, the mean value, and the median value between the highest point and the lowest point based on the collected information and an alarm gradient value to compare the peak interval, the mean value, and the median value between the highest point and the lowest point collected in real time by the driving of the driving unit, and a gradient value with the alarm upper limit, the alarm lower limit, and the alarm gradient value to issue an alarm when a suspected abnormal condition of the driving unit is satisfied and induce the driving unit to be repaired or replaced at a right time, to prevent a huge loss caused by the malfunction of the driving unit in advance.

BACKGROUND ART

Generally, stable driving is very important for a driving unit (for example, a motor, a pump, a conveyer, and a compressor) used for an automation process of equipment.

For example, hundreds of driving units are installed in the facilities of a large-scale transfer factory to continuously transfer materials to be transferred while interlocking with each other. If any one of the plurality of driving units is broken, a tremendous situation in which the entire operation of the facilities is stopped may occur.

In this case, due to the down-time caused by the malfunction of the driving unit, a huge loss may be caused by not only the repair cost of the driving unit, but also the operating cost which is wasted while the facilities are stopped and the business effect.

According to the recent data of the Ministry of Employment and Labor and the Korea Occupational Safety and Health Agency, the total number of casualties resulting from annual industry safety accidents is estimated to be about 100,000 and when it is converted into the cost, it is estimated that 18 trillion won is lost annually.

As a way to avoid such unexpected down-time costs, it is urgent to introduce a preliminary predictive maintenance system. Even though there was an effort to improve the problems in the name of predictive maintenance, for more effective predictive maintenance, it is necessary to develop a more advanced predictive maintenance method.

DISCLOSURE

Technical Problem

The present invention is proposed to solve the problems described above and an object is to provide a precise predictive maintenance method for a driving unit which measures and collects a peak interval, a mean value, and a median value between a highest point and a lowest point of a driving period from driving information of a driving unit in a normal state and driving information of the driving unit before a malfunction is generated and sets an alarm upper limit and an alarm lower limit for the peak interval, the mean value, and the median value between the highest point and the lowest point based on the collected information and an alarm gradient value to compare the peak interval, the mean value, and the median value between the highest point and the lowest point collected in real time by the driving of the driving unit, and a gradient value with the alarm upper limit, the alarm lower limit, and the alarm gradient value to issue an alarm when a suspected abnormal condition of the driving unit is satisfied and induce the driving unit to be repaired or replaced at a right time, to prevent a huge loss caused by the malfunction of the driving unit in advance.

Further, another object is to provide a precise predictive maintenance method for a driving unit which presents various detection conditions in order to search for various abnormal signs which may occur in the driving unit and issues an alarm to the user when the detection conditions are satisfied to not only easily detect various abnormal signs generated in the driving unit, but also ensure an excellent reliability for a detection result.

Technical Solution

According to an aspect of the present invention, a precise predictive maintenance method for a driving unit includes a first base information collecting step S10 of dividing change information of an energy size in accordance with a time measured in a normal driving state of a driving unit into a peak period and a mean period, forcibly dividing the mean period by a set time interval to set the divided period as a driving period, collecting a peak interval between a highest point with a largest energy value in the driving period and a lowest point with a smallest energy value, and connecting a peak interval of the driving period and a peak interval of repetitive another driving period to collect gradient information for the peak interval between the driving periods, a second base information collecting step S20 of connecting a peak interval between a highest point and a lowest point of the driving period in a driving state of the driving unit before the malfunction of the driving unit is generated and a peak interval of repetitive another driving period to collect gradient information of the peak interval between the driving periods; a setting step S30 of setting an alarm gradient value for the peak interval between the driving periods based on the gradient information collected in the base information collecting steps S10 and S20, and a detecting step S40 of detecting the driving unit to be an abnormal state when an average gradient value for the peak interval between the driving periods measured with an interval of unit times set in the real-time driving state of the driving unit exceeds the alarm gradient value set in the setting step S30, the unit time is set to include at least two driving periods, and an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit.

Further, in the first base information collecting step S10, a driving period in the normal driving state of the driving unit is divided into n equal parts by an arbitrary time interval and energy values of the equal parts are extracted and added to calculate a mean value and a mean value of the driving period and a mean value of repetitive another driving period are connected to collect gradient information for the mean value between driving periods, in the second base information collecting step S20, a mean value of the driving period in the driving state of the driving unit before the malfunction of the driving unit is generated and a mean value of repetitive another driving period are connected to collect gradient information for the mean value between the driving periods, in the setting step S30, an alarm gradient value for the mean value between the driving periods is set based on the gradient information collected in the base information collecting steps S10 and S20, and in the detecting step S40, when an average gradient value for the mean value between the driving periods measured with the interval of unit times set in the real-time driving state of the driving unit exceeds the alarm gradient value set in the setting step S30, the driving unit is detected to be an abnormal state, and the unit time is set to include at least two driving periods.

Further, in the first base information collecting step S10, a driving period in the normal driving state of the driving unit is divided into n equal parts by an arbitrary time interval and energy values of the equal parts are extracted and then the extracted energy values are listed in the order of size to set a value located in the middle as a median value, and the median value of the driving period and a median value of repetitive another driving period are connected to collect gradient information for the mean value between driving periods, in the second base information collecting step S20, a median value of the driving period in the driving state of the driving unit before the malfunction of the driving unit is generated and a median value of repetitive another driving period are connected to collect gradient information for the median value between the driving periods, in the setting step S30, an alarm gradient value for the median value between the driving periods is set based on the gradient information collected in the base information collecting steps S10 and S20, and in the detecting step S40, when an average gradient value for the median value between the driving periods measured with the interval of unit times set in the real-time driving state of the driving unit exceeds the alarm gradient value set in the setting step S30, the driving unit is detected to be an abnormal state, and when one median value is obtained, the value is used as a median value and when two values are obtained, the values are added and averaged to be used as a median value, and the unit time is set to include at least two driving periods.

Further, in the first base information collecting step S10, a peak interval between a highest point and a lowest point measured in the driving period of the normal driving state of the driving unit, a mean value and a median value are collected, in the second base information collecting step S20, a peak interval between a highest point and a lowest point measured in the driving period before the malfunction of the driving unit is generated, a mean value and a median value are collected, in the setting step S30, alarm upper limits and alarm lower limits for the peak interval between the highest point and the lowest point, the mean value, and the median value are set based on the information collected in the base information collecting steps S10 and S20, and in the detecting step S40, when the peak interval between the highest point and the lowest point of the driving period of the change information of the energy size in accordance with the time measured in the real-time driving state of the driving unit, the mean value, and the median value exceed the alarm upper limits for the peak interval between the highest point and the lowest point, the mean value, and the median value set in the setting step S30 or is lower than the alarm lower limits, the driving unit is detected to be an abnormal state.

Advantageous Effects

According to the present invention, the precise predictive maintenance method for a driving unit measures and collects a peak interval, a mean value, and a median value between a highest point and a lowest point of a driving period from driving information of a driving unit in a normal state and driving information of the driving unit before a malfunction is generated and sets an alarm upper limit and an alarm lower limit and an alarm gradient value for the peak interval, the mean value, and the median value between the highest point and the lowest point based on the collected information to compare the peak interval, the mean value, and the median value between the highest point and the lowest point collected in real time by the driving of the driving unit, and a gradient value with the alarm upper limit, the alarm lower limit, and the alarm gradient value to issue an alarm when a suspected abnormal condition of the driving unit is satisfied and induce the driving unit to be repaired or replaced at a right time, thereby preventing a huge loss caused by the malfunction of the driving unit in advance.

Further, the precise predictive maintenance method presents various detection conditions in order to search for various abnormal signs which may occur in the driving unit and issues an alarm to the user when the detection conditions are satisfied, thereby not only easily detecting various abnormal signs generated in the driving unit, but also ensuring an excellent reliability for a detection result.

BEST MODE

The present invention relates to a precise predictive maintenance method for a driving unit and a configuration thereof includes a first base information collecting step S10 of dividing change information of an energy size in accordance with a time measured in a normal driving state of a driving unit into a peak period and a mean period, forcibly dividing the mean period by a set time interval to set the divided period as a driving period, collecting a peak interval between a highest point with a largest energy value in the driving period and a lowest point with a smallest energy value, and connecting a peak interval of the driving period and a peak interval of repetitive another driving period to collect gradient information for the peak interval between the driving periods, a second base information collecting step S20 of connecting a peak interval between a highest point and a lowest point of the driving period in a driving state of the driving unit before the malfunction of the driving unit is generated and a peak interval of repetitive another driving period to collect gradient information of the peak interval between the driving periods; a setting step S30 of setting an alarm gradient value for the peak interval between the driving periods based on the gradient information collected in the base information collecting steps S10 and S20, and a detecting step S40 of detecting the driving unit as an abnormal state when an average gradient value for the peak interval between the driving periods measured with an interval of unit times set in the real-time driving state of the driving unit exceeds the alarm gradient value set in the setting step S30.

MODE FOR CARRYING OUT THE INVENTION

A precise predictive maintenance method for a driving unit according to an exemplary embodiment of the present invention will be described in detail based on the accompanying drawings. A detailed description of known functions and configurations determined to unnecessarily obscure the gist of the present invention will be omitted.

Figure 1:
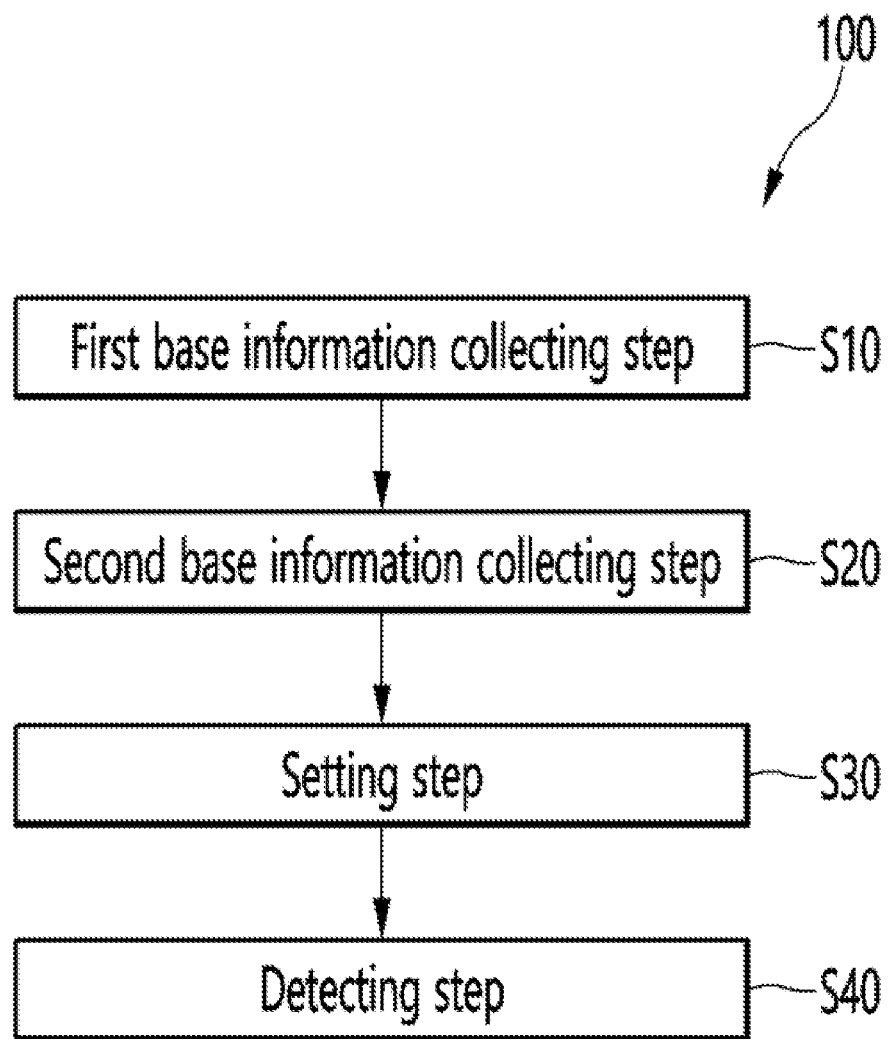
FIG. 1 is a block diagram of a precise predictive maintenance method for a driving unit according to an embodiment of the present invention.
Figure 2:
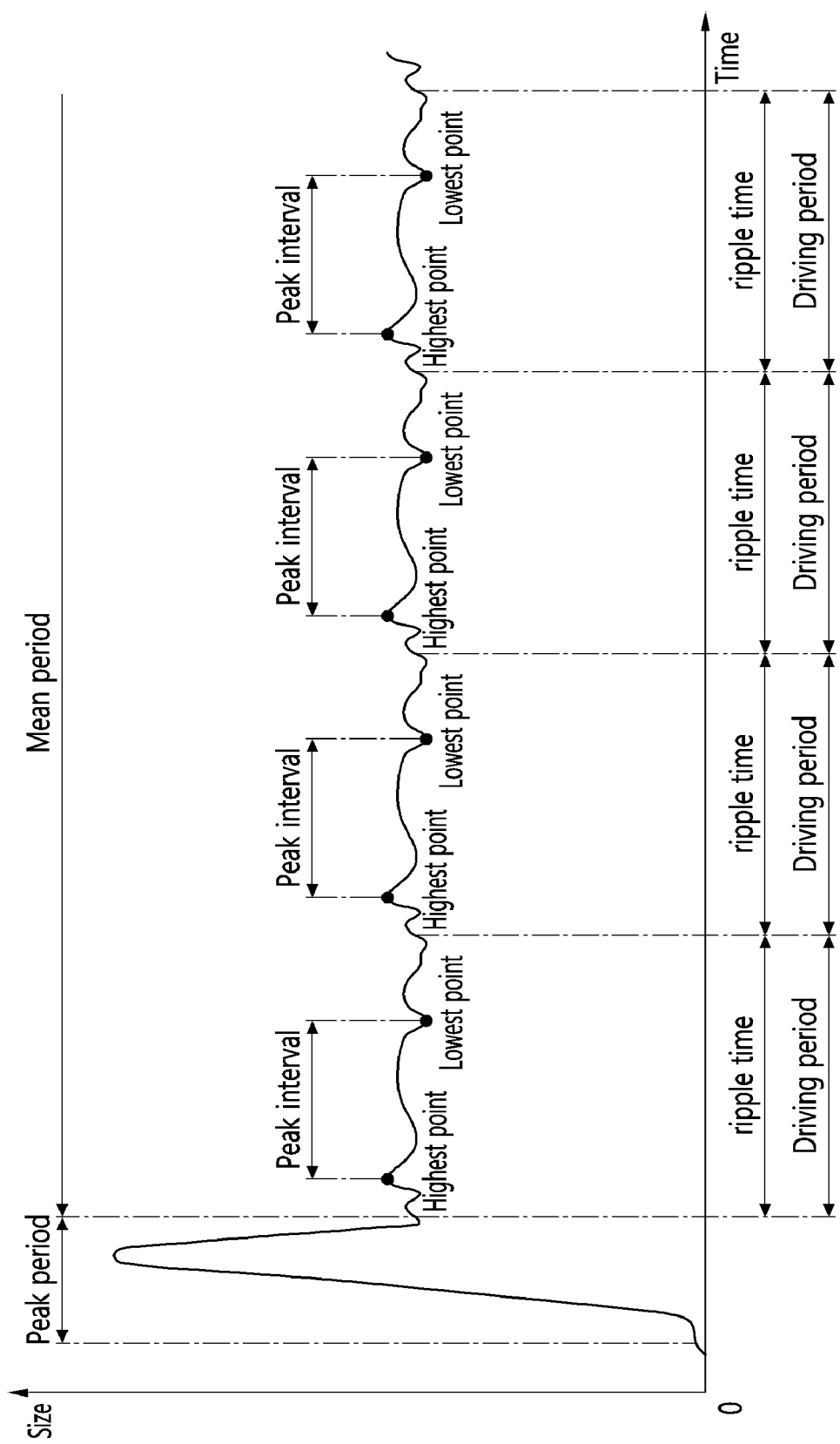
FIG. 2 is a view for extracting a peak interval between a highest point and a lowest point extracted from a driving period divided from a mean period of a driving unit.
Figure 3:
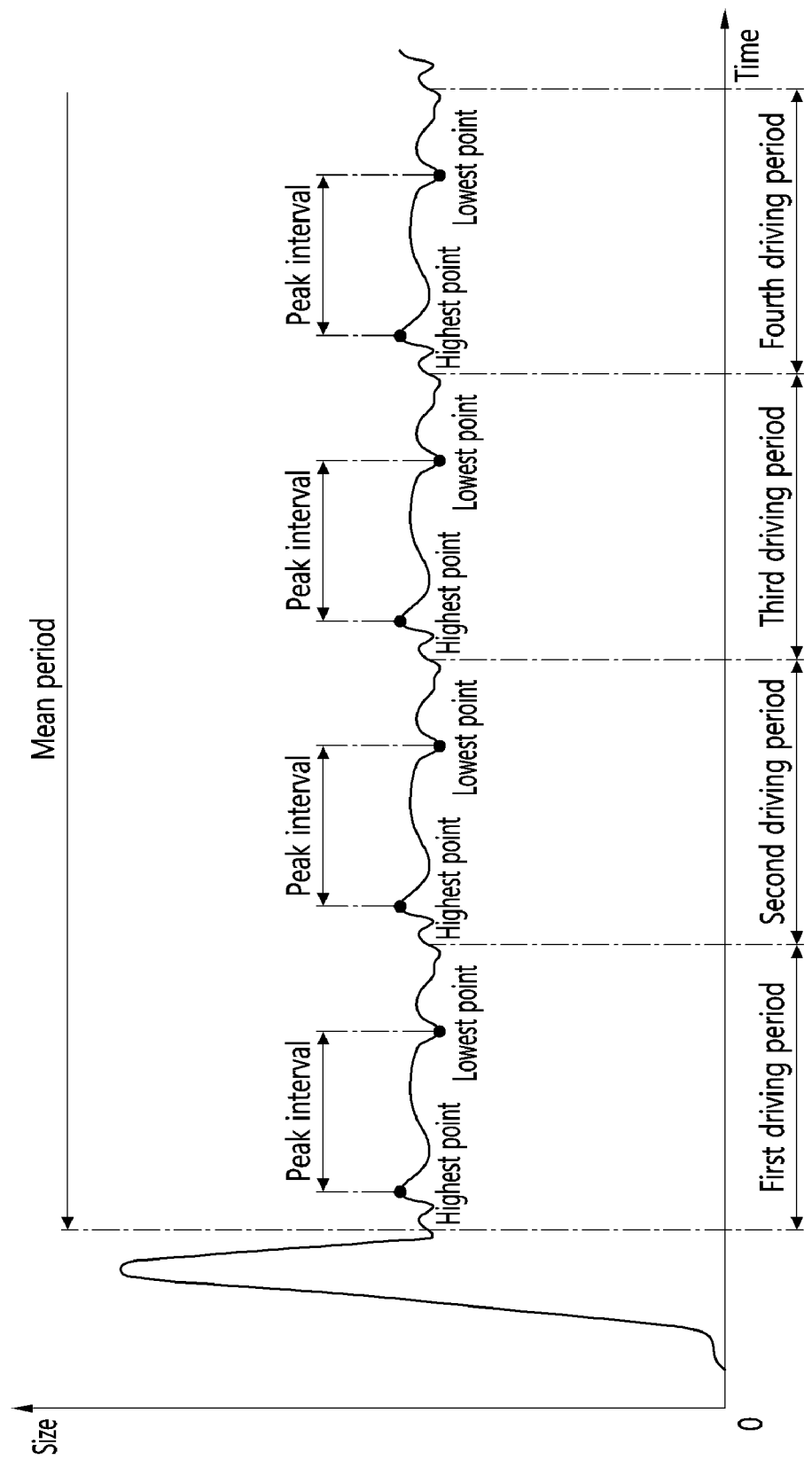
FIG. 3 is a view for extracting a peak interval between a highest point and a lowest point from a mean period of a driving unit which is driven in real time.
Figure 4:
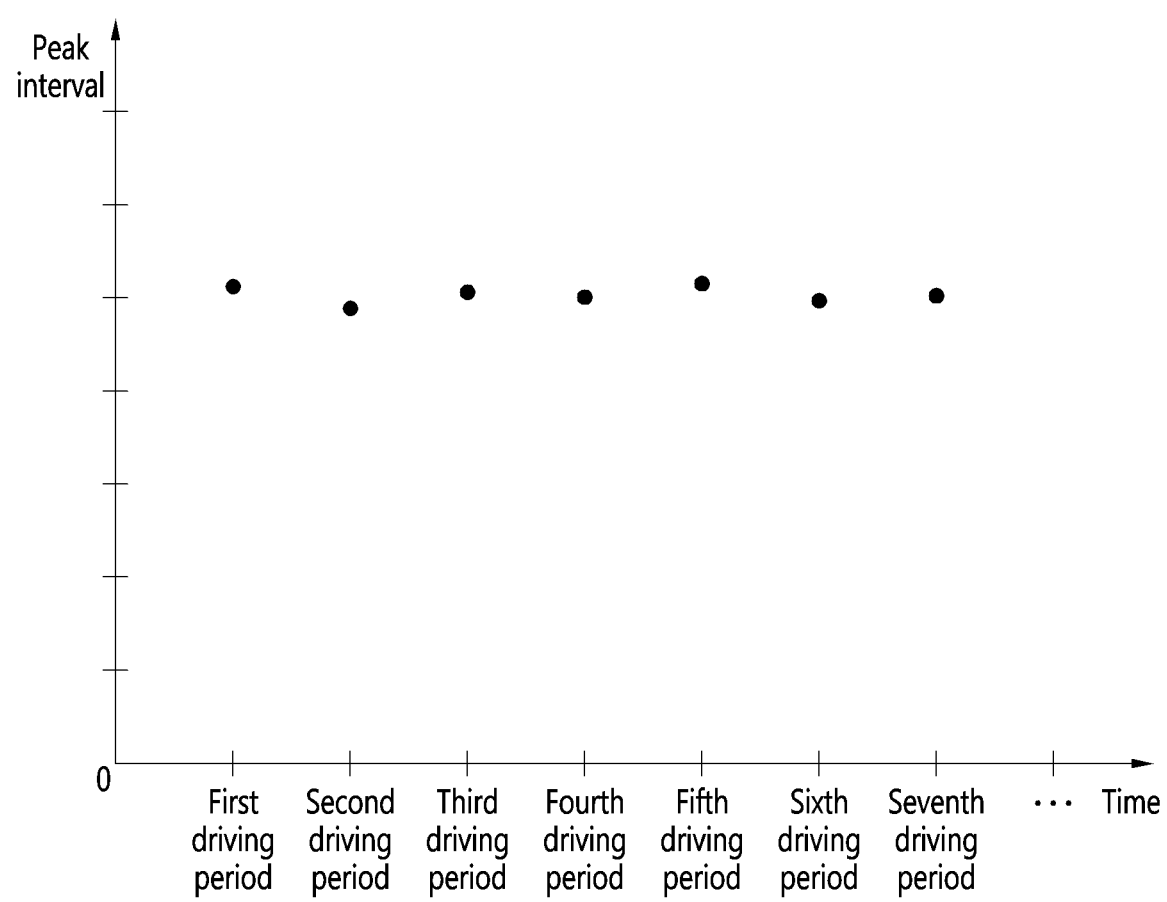
FIG. 4 is a view illustrating a numerical value of a peak interval illustrated in FIG. 3.
Figure 5:
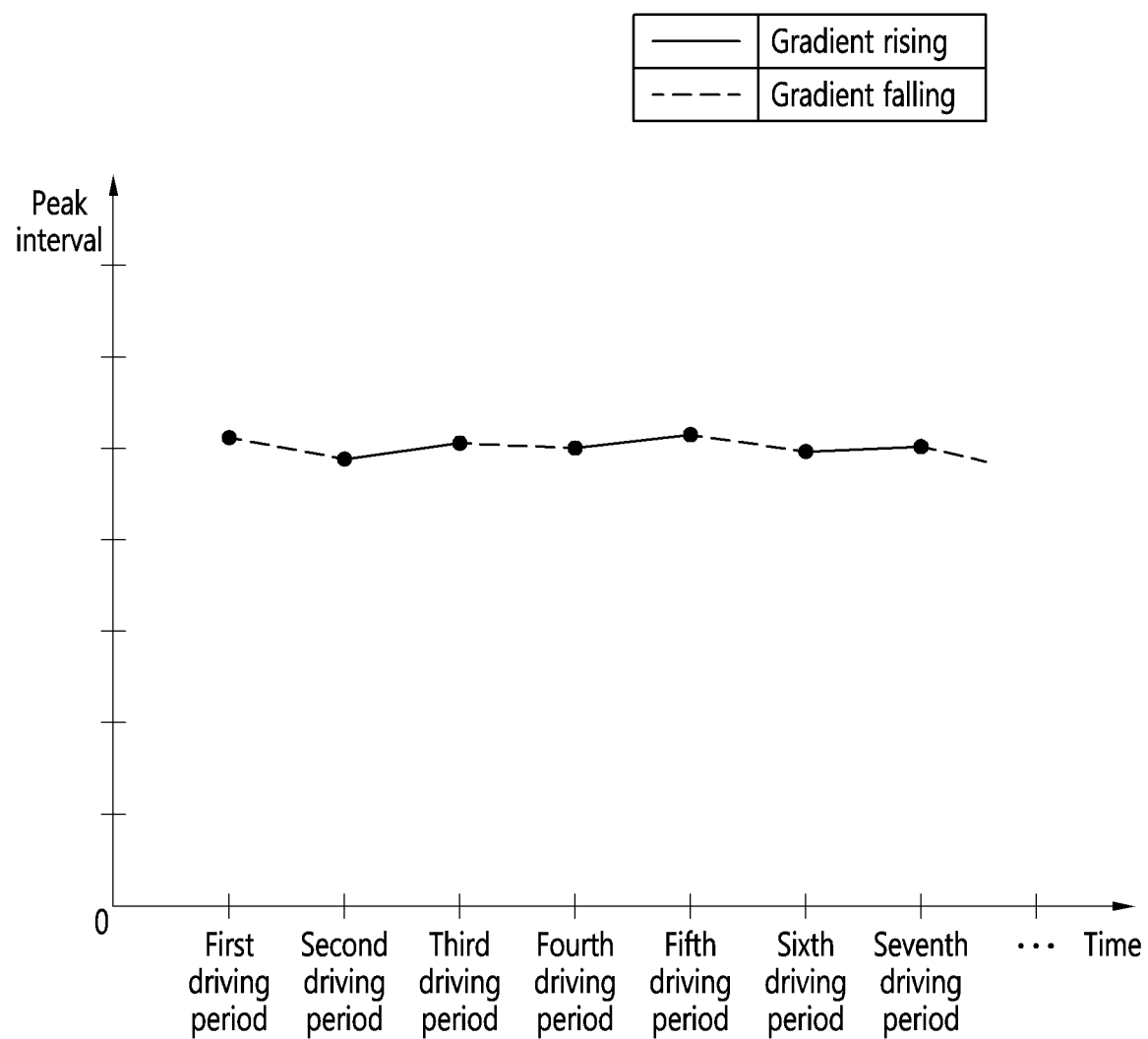
FIG. 5 is a view for extracting a gradient value based on the peak interval illustrated in FIG. 4.
Figure 6:
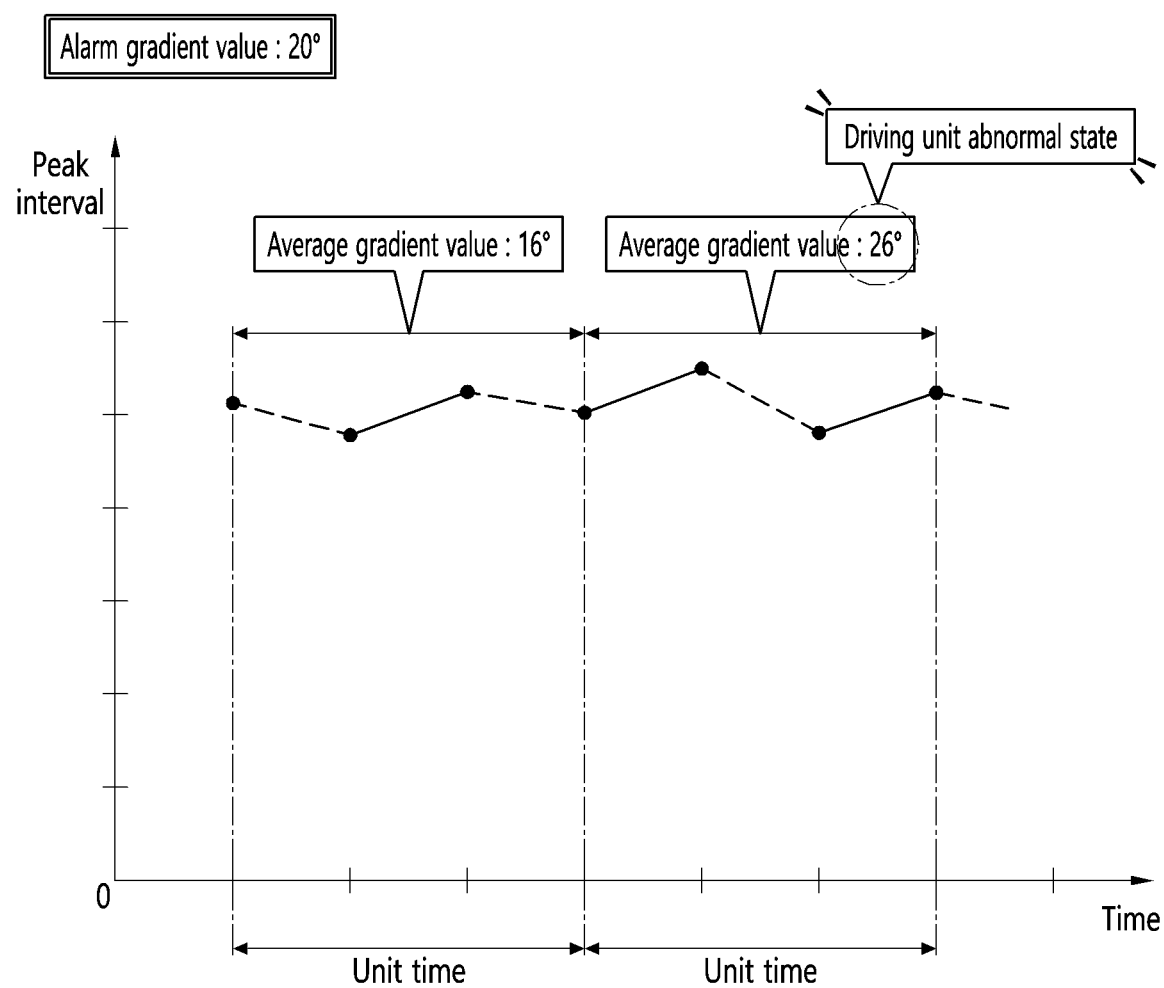
FIG. 6 is a view for extracting an average gradient value of the peak interval between driving periods measured with an interval of unit times.
Figure 7:
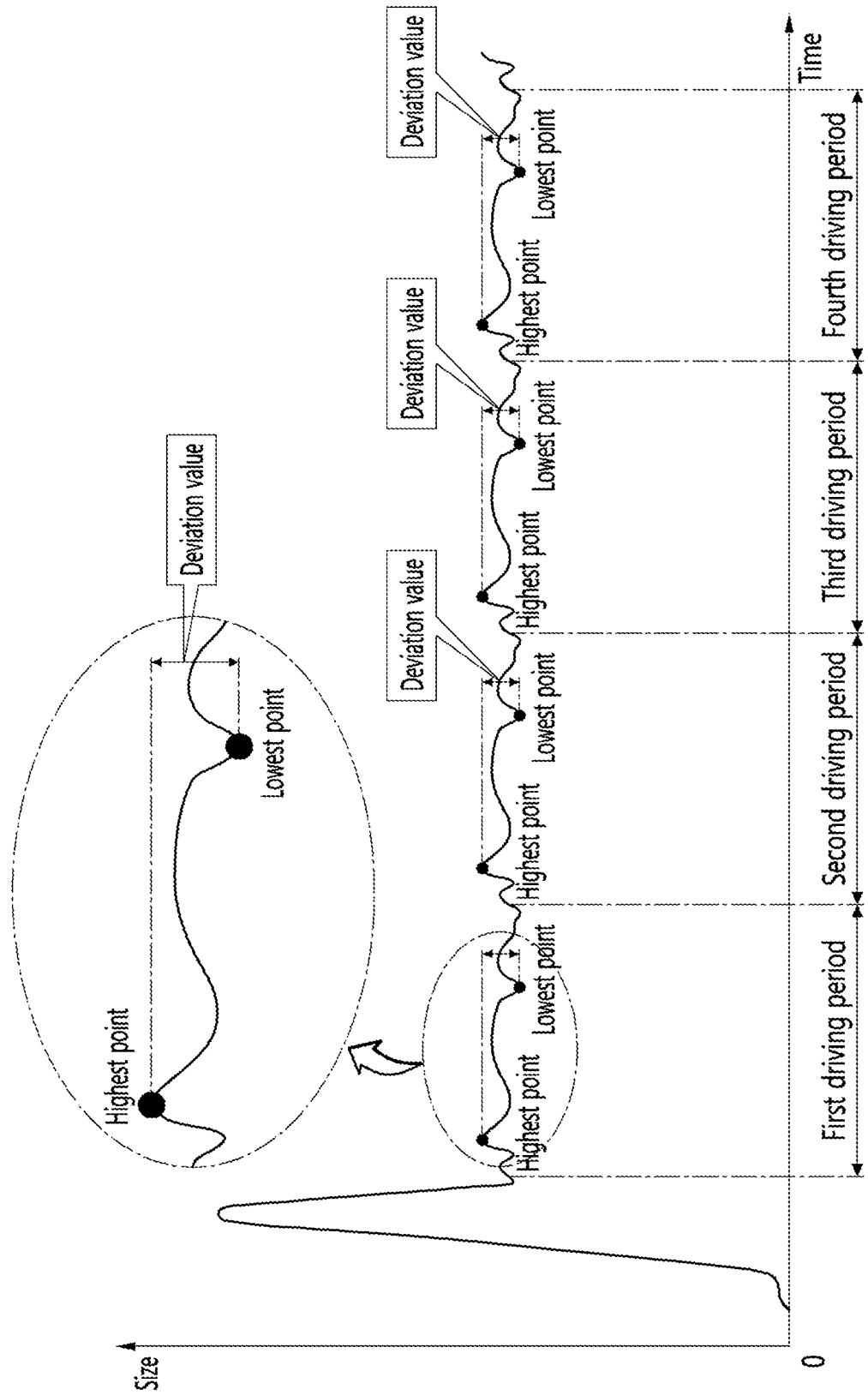
FIG. 7 is a view for extracting a deviation value between a highest point and a lowest point in a repetitive driving period of a driving unit.
Figure 8:
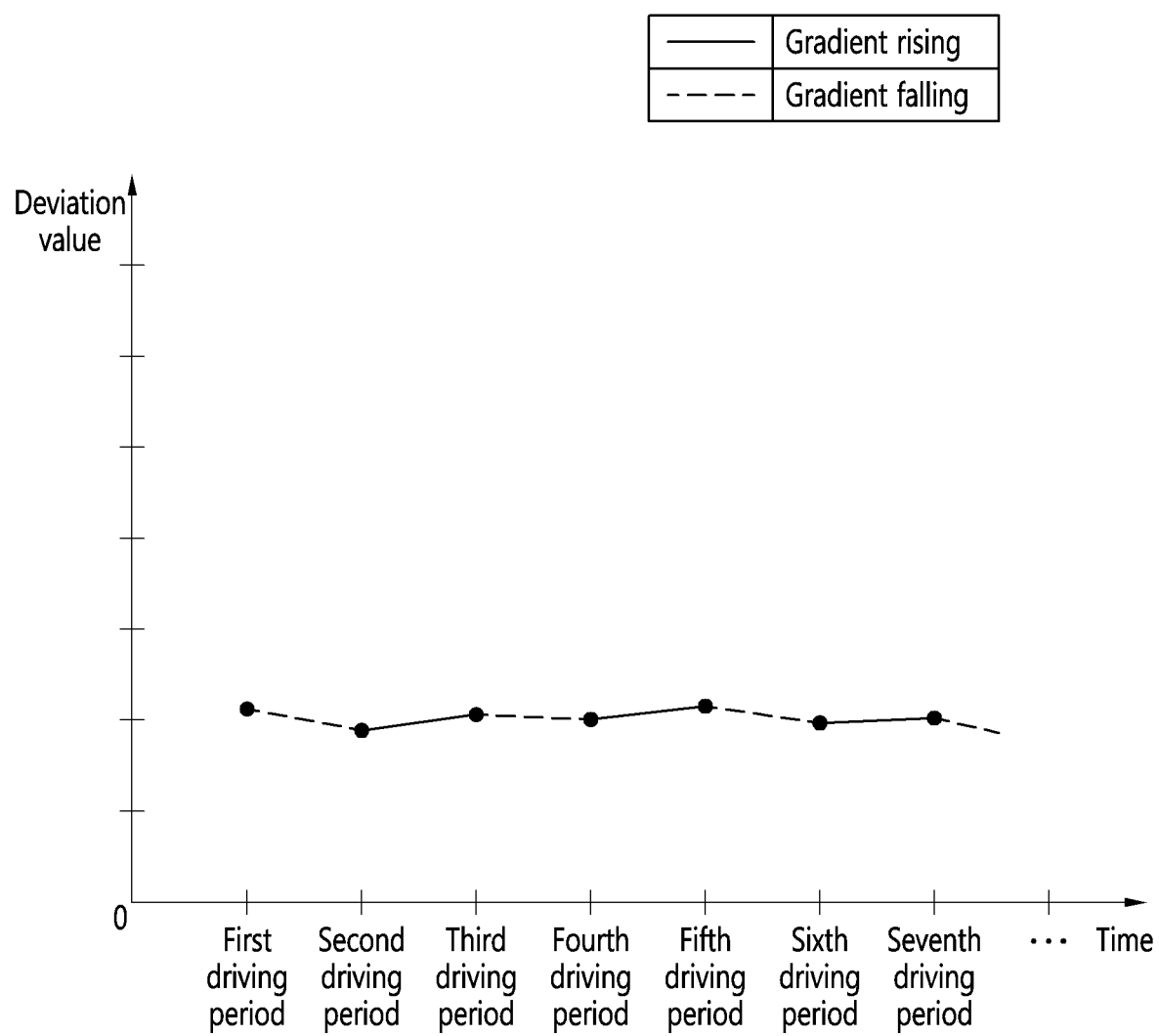
FIG. 8 is a view for extracting a gradient value based on the deviation value illustrated in FIG. 7.
Figure 9:
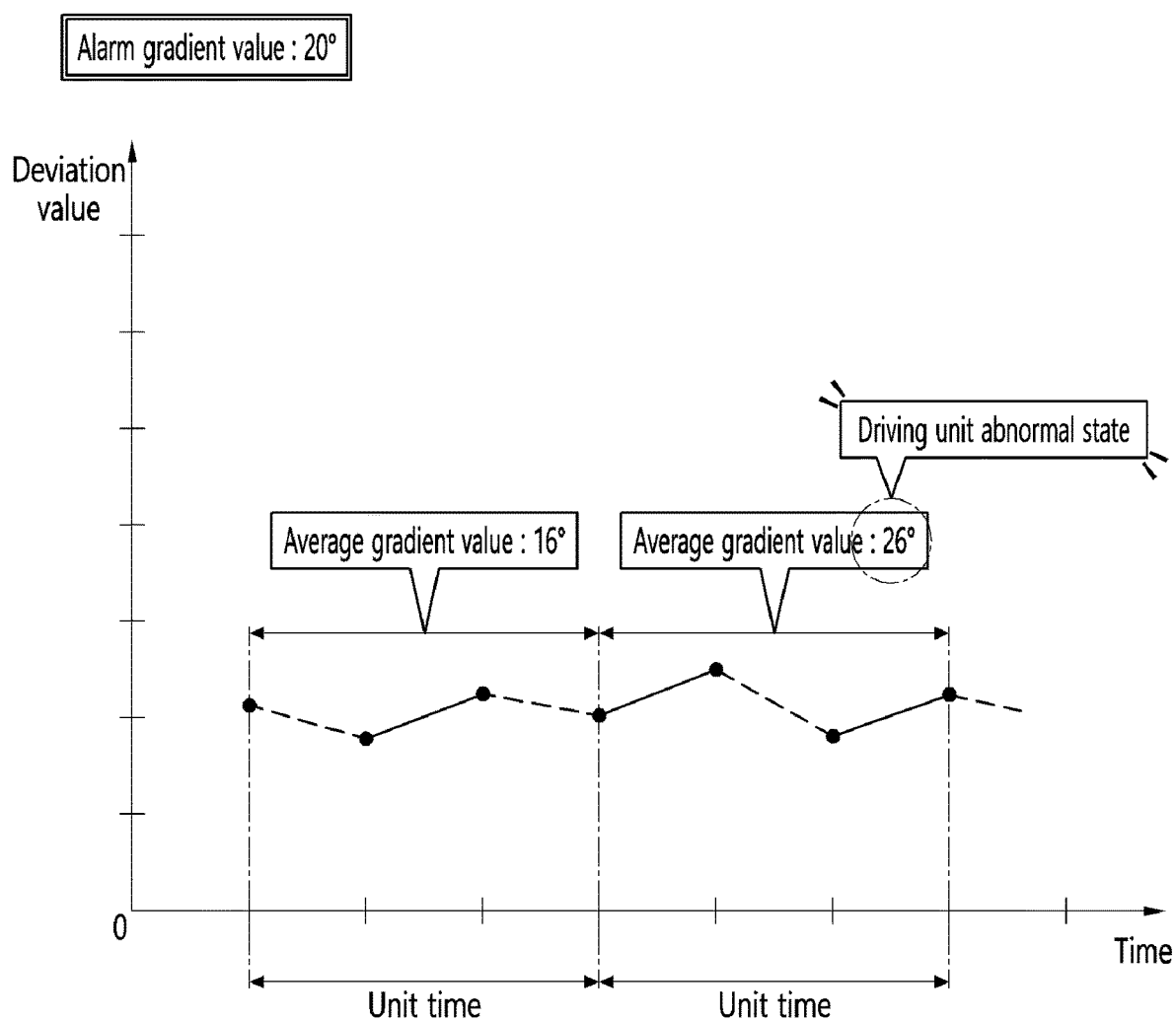
FIG. 9 is a view for extracting an average gradient value of the deviation value between driving periods measured with an interval of unit times.
Figure 10:
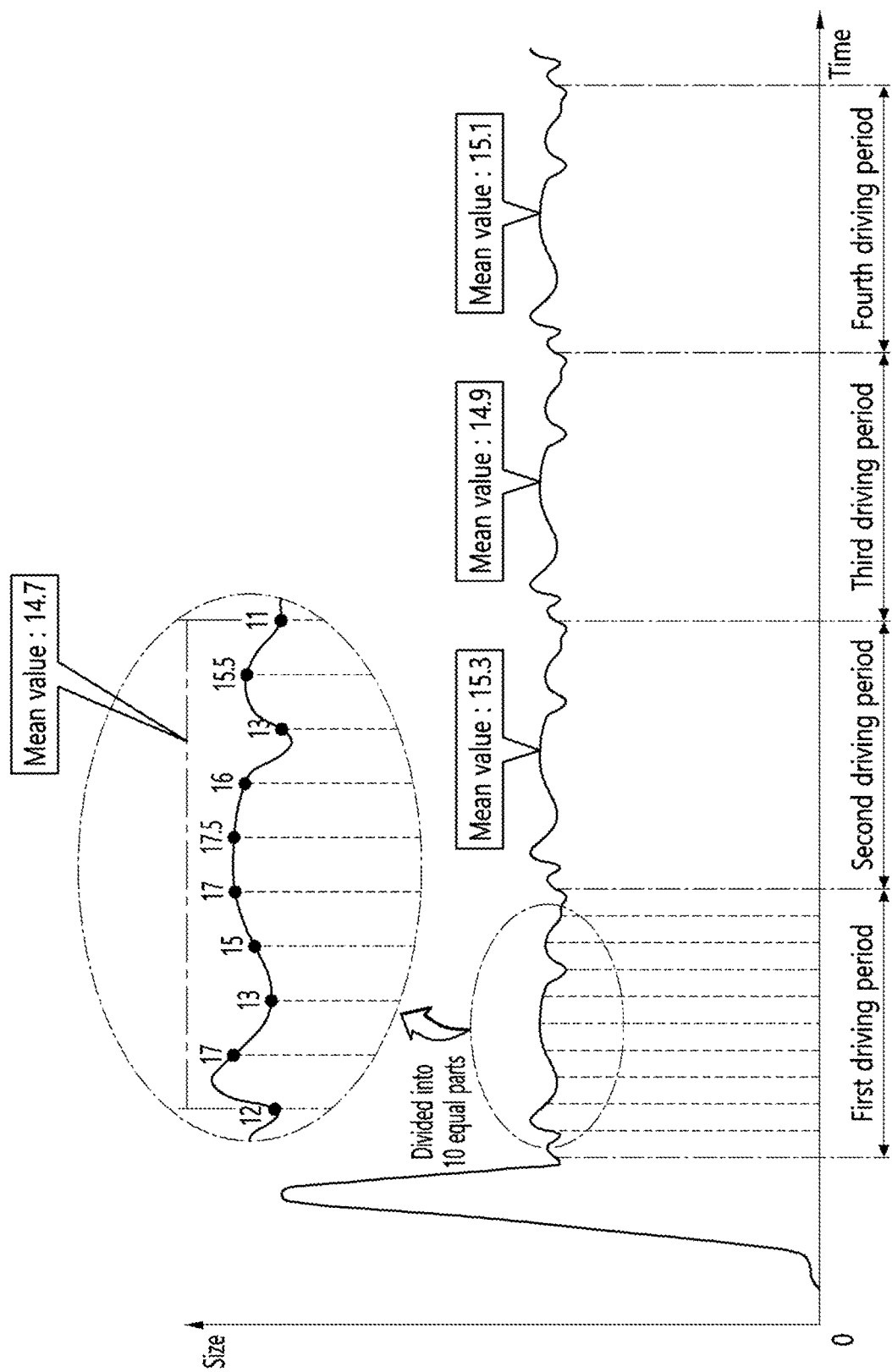
FIG. 10 is a view for extracting a mean value by dividing a repetitive driving period of a driving unit into equal parts.
Figure 11:
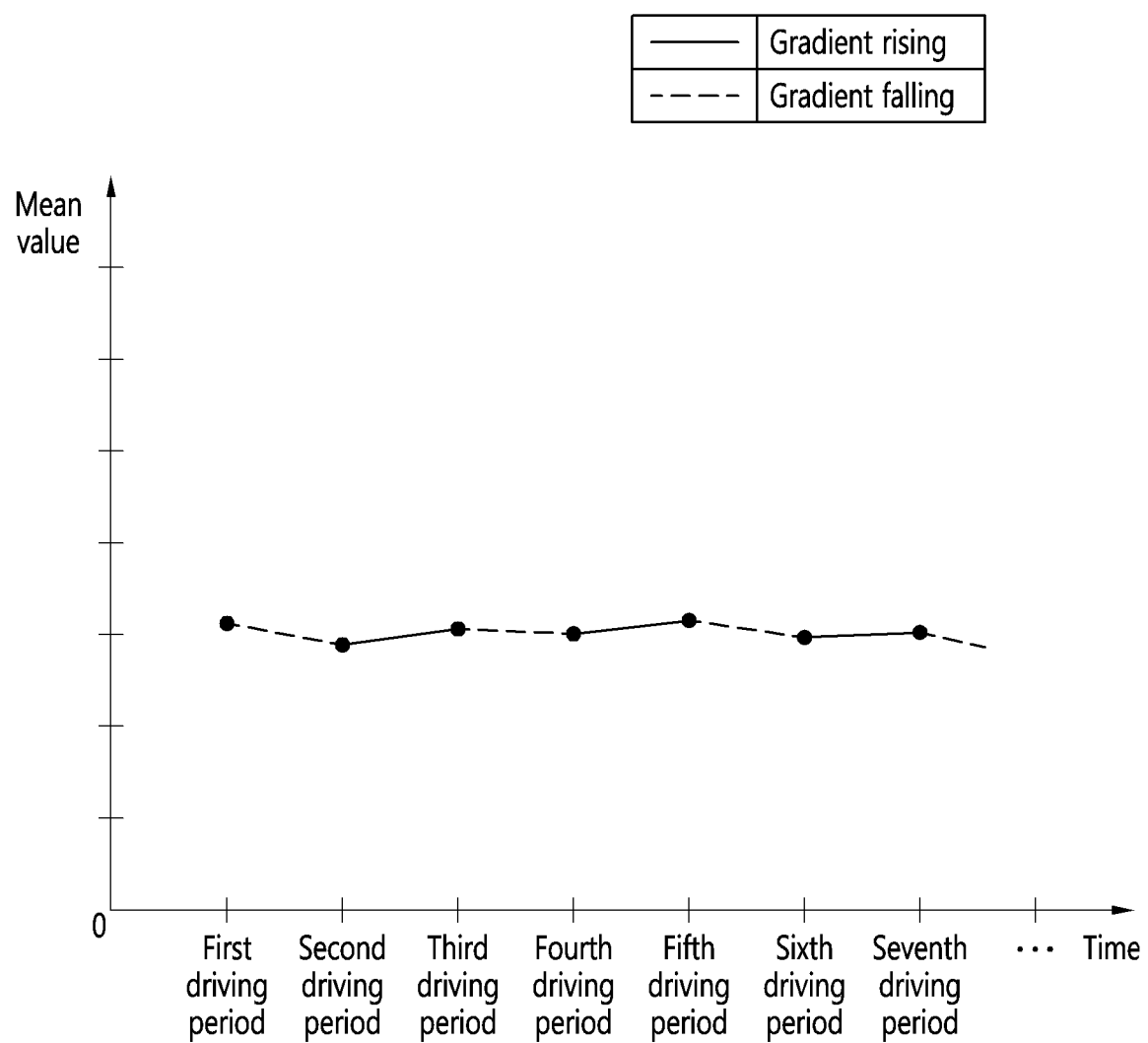
FIG. 11 is a view for extracting a gradient value based on the mean value illustrated in FIG. 10.
Figure 12:
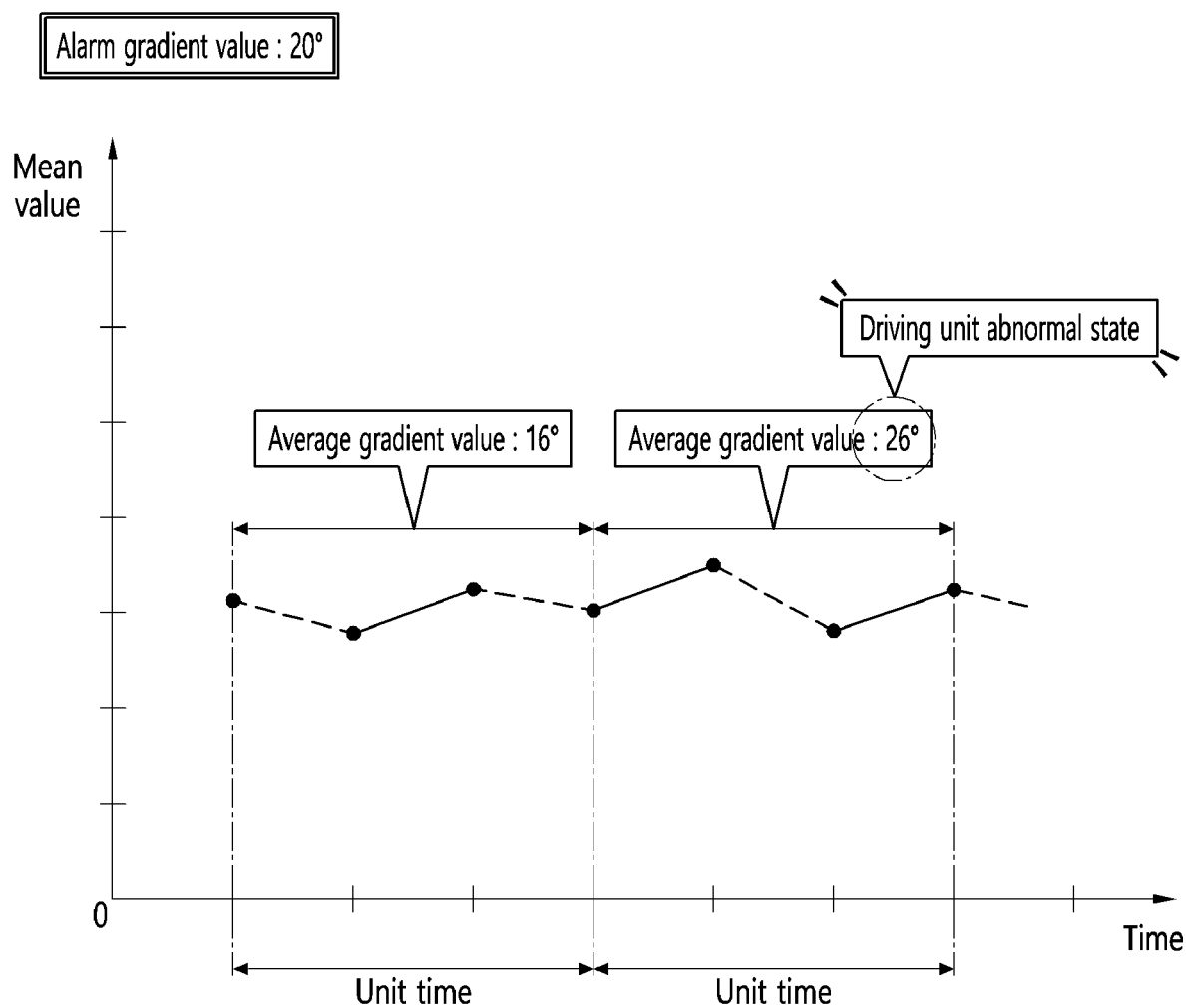
FIG. 12 is a view for extracting an average gradient value of a mean value between driving periods measured with an interval of unit times.
Figure 13:
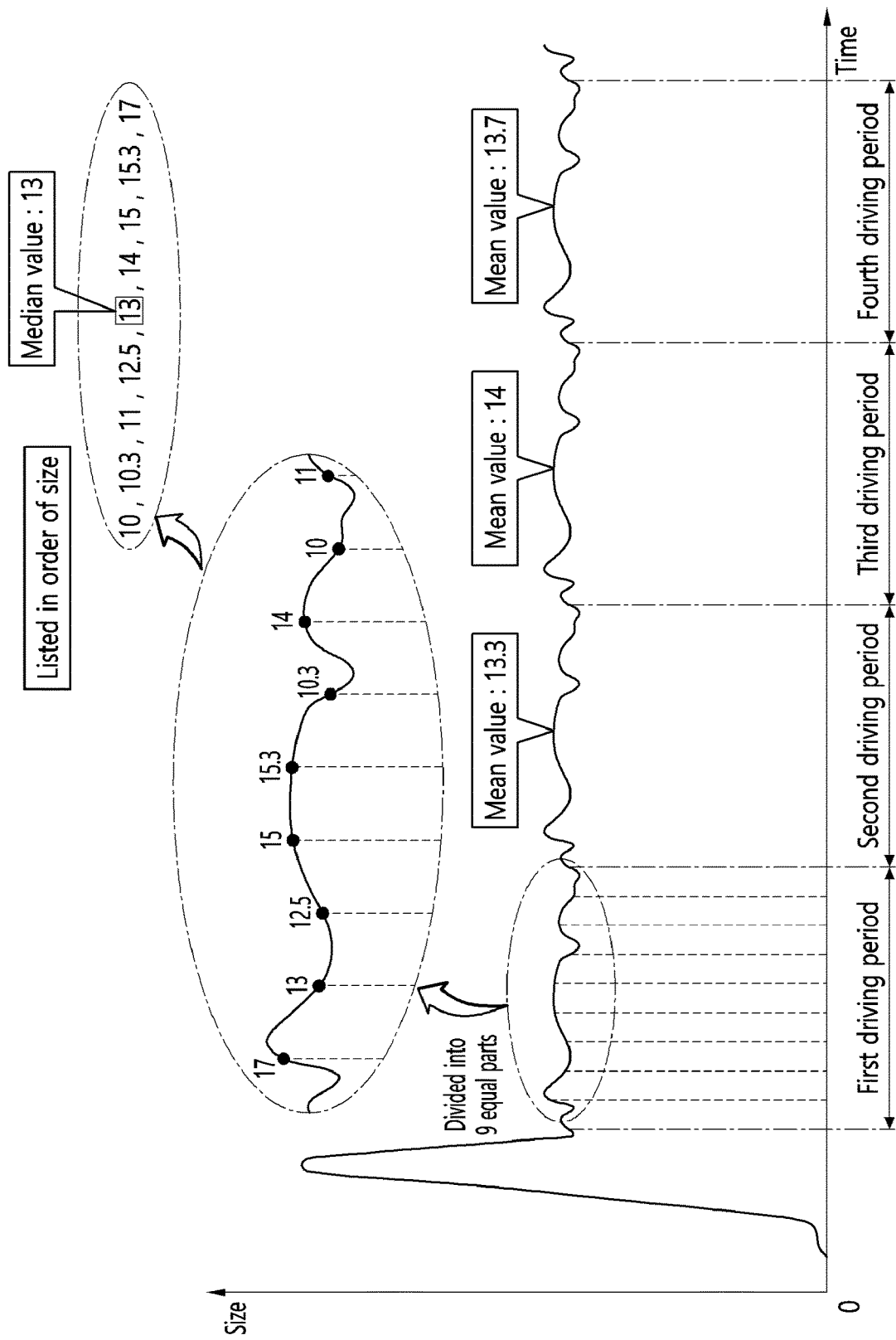
FIG. 13 is a view for extracting a median value by dividing a repetitive driving period of a driving unit into equal parts.
Figure 14:
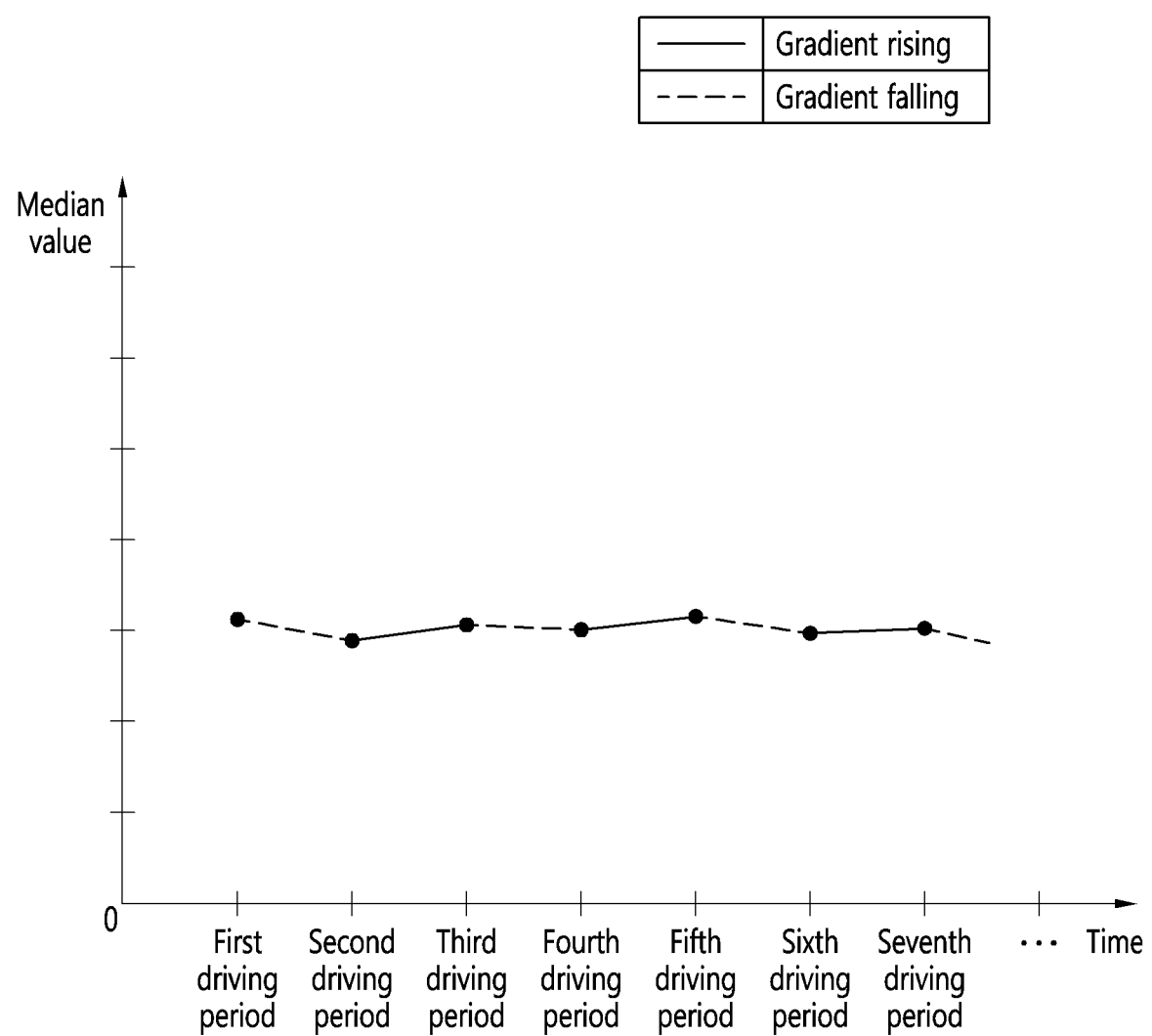
FIG. 14 is a view for extracting a gradient value based on the median value illustrated in FIG. 13.
Figure 15:
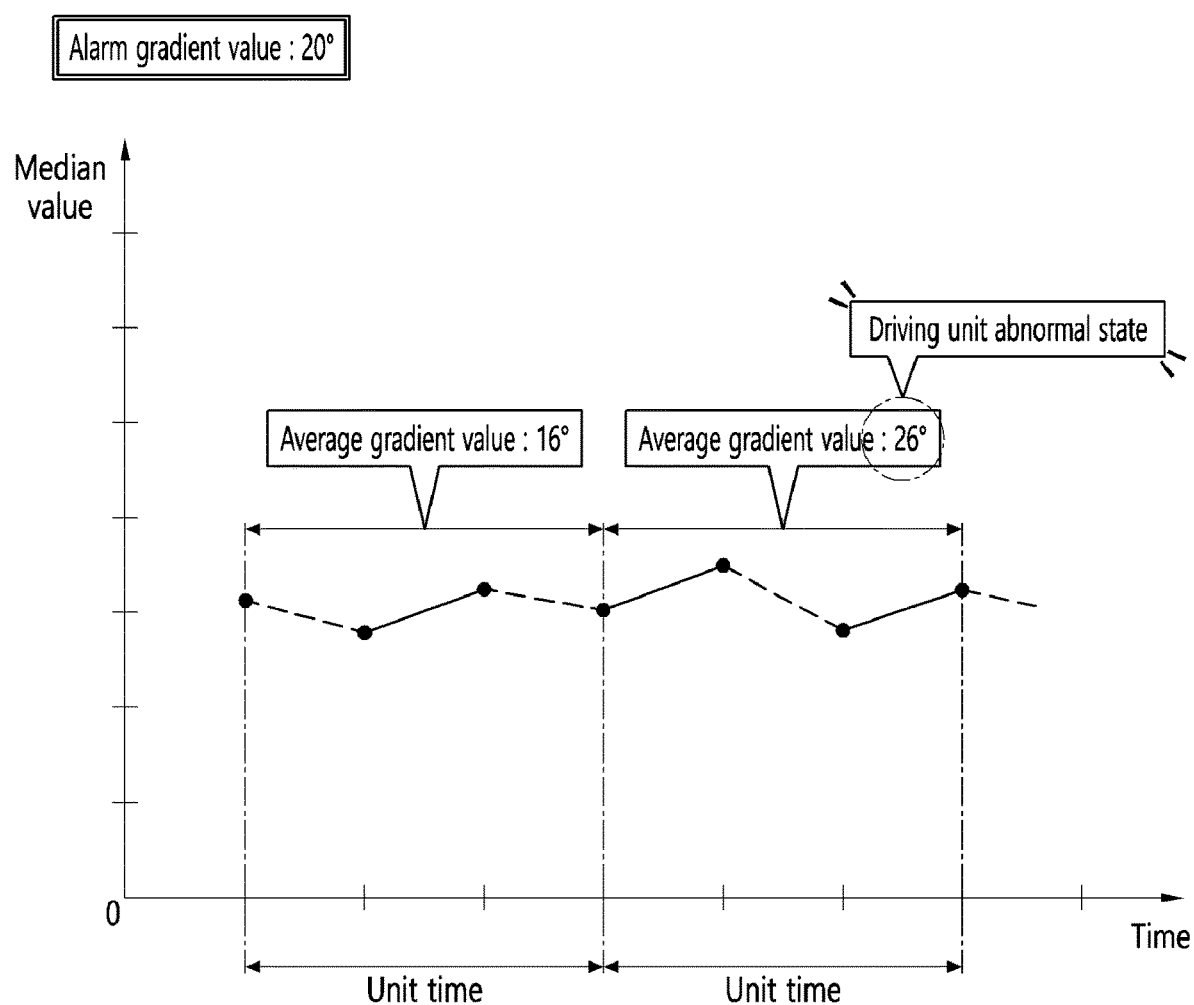
FIG. 15 is a view for extracting an average gradient value of a median value between driving periods measured with an interval of unit times.
Figure 16:
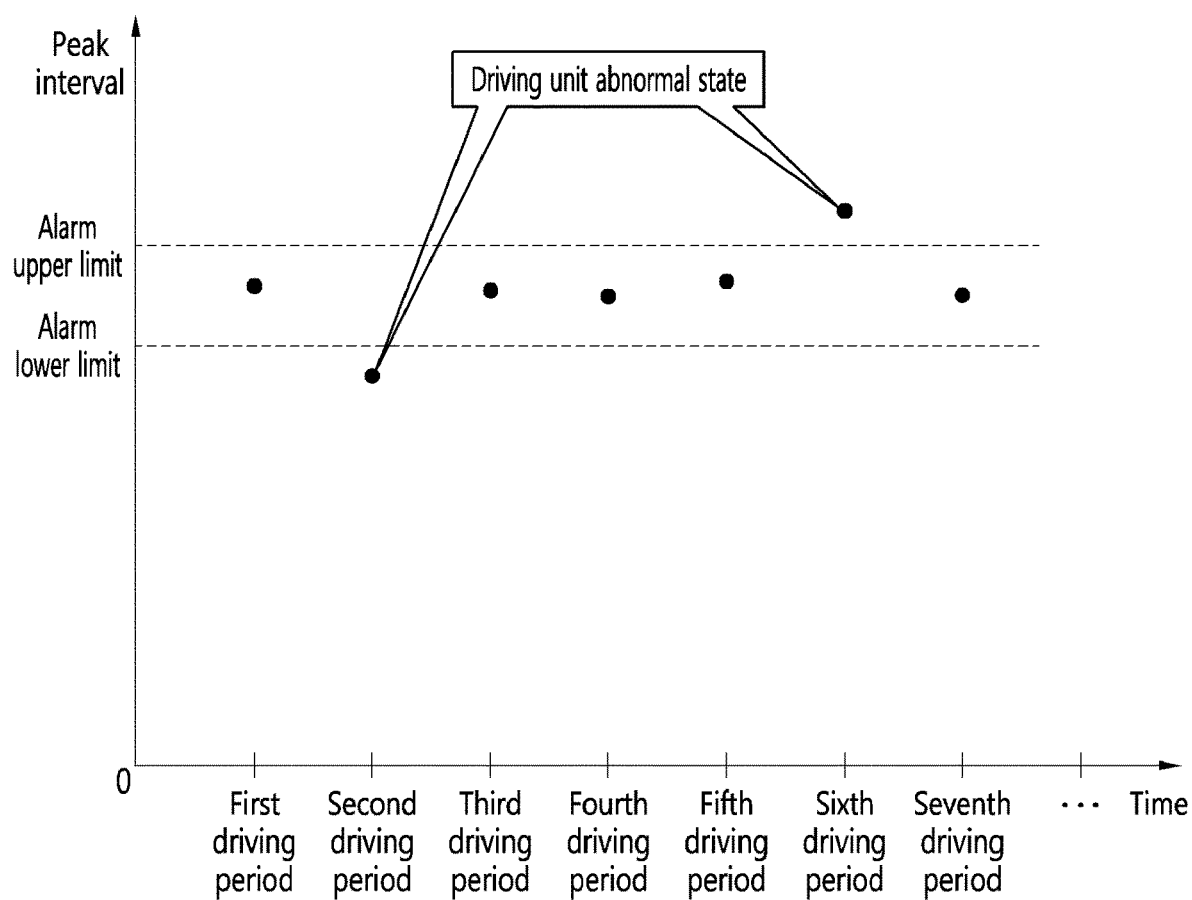
FIG. 16 is a view for detecting an abnormal state of a driving unit with a peak interval of a highest point and a lowest point of a driving period of a driving unit.
Figure 17:
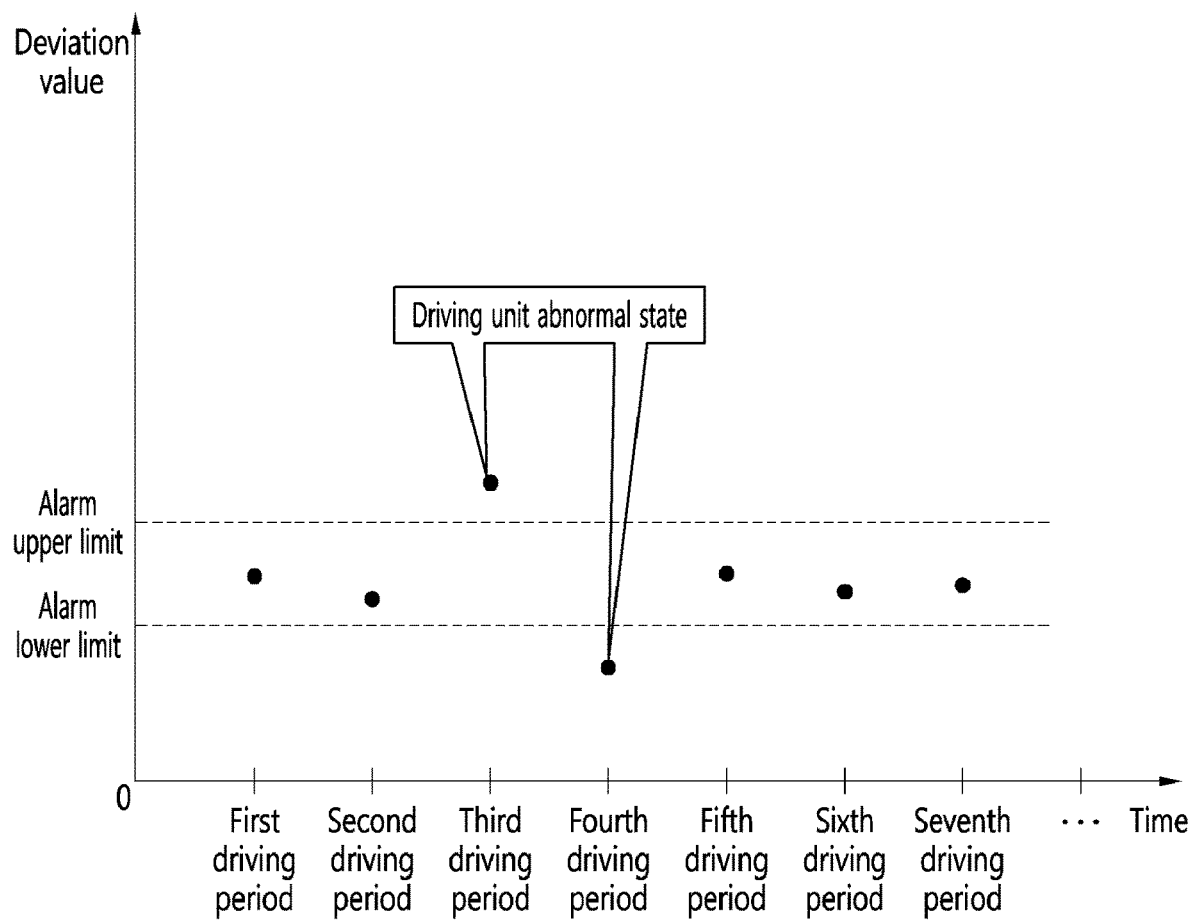
FIG. 17 is a view for detecting an abnormal state of a driving unit with a deviation value of a highest point and a lowest point of a driving period of a driving unit.
Figure 18:
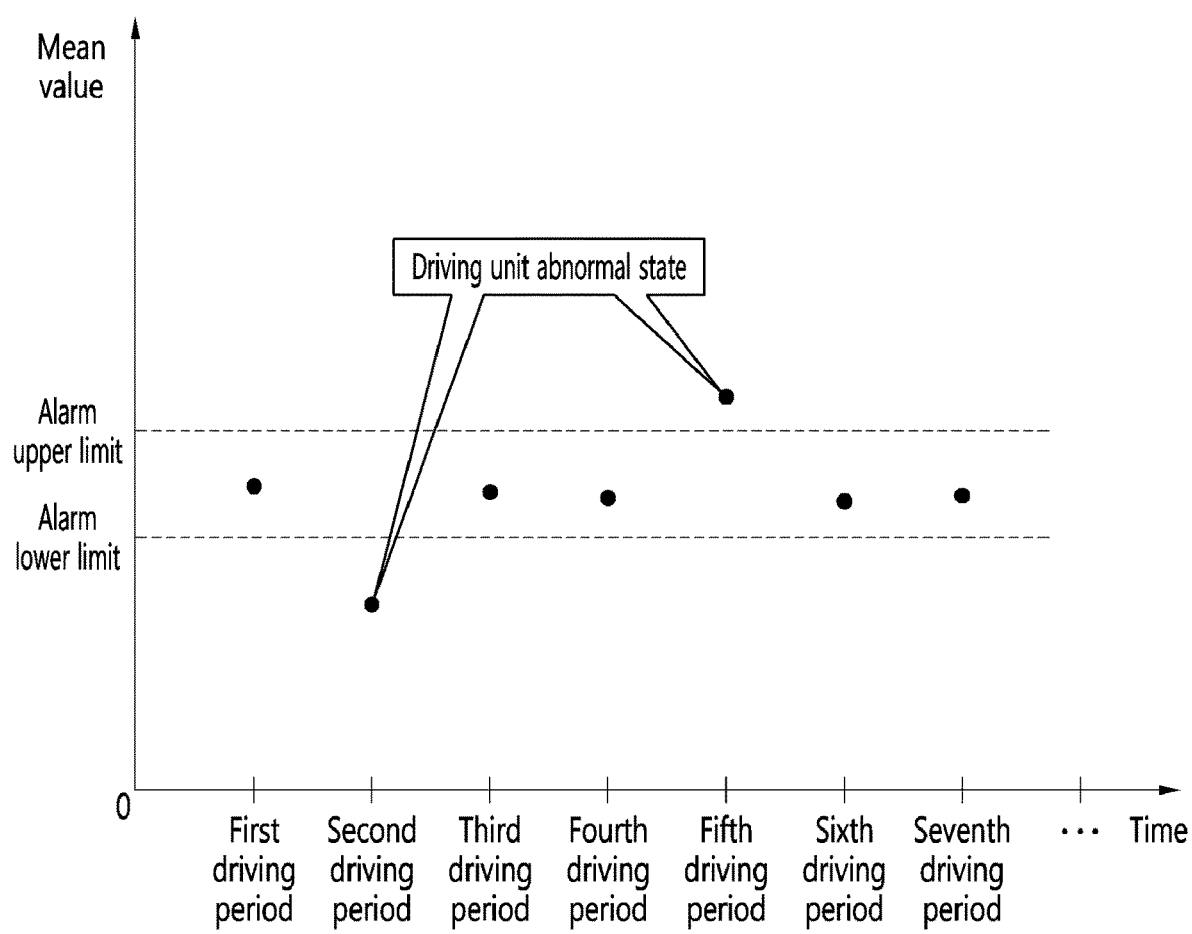
FIG. 18 is a view for detecting an abnormal state of a driving unit with a mean value of a driving period of a driving unit.
Figure 19:
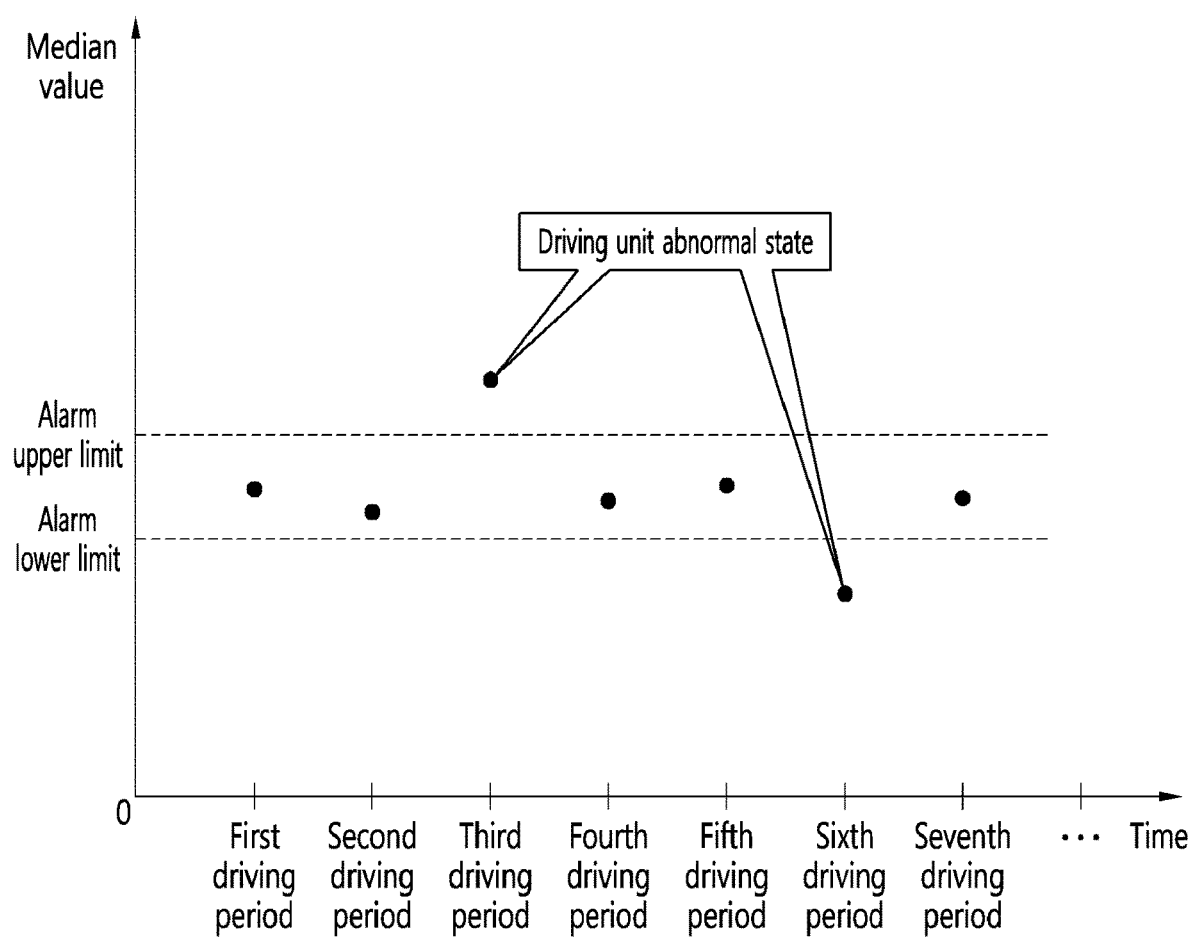
FIG. 19 is a view for detecting an abnormal state of a driving unit with a median value of a driving period of a driving unit.

FIGS. 1 to 19 illustrate a precise predictive maintenance method for a driving unit according to the exemplary embodiment of the present invention in which FIG. 1 is a block diagram of a precise predictive maintenance method for a driving unit according to an embodiment of the present invention, FIG. 2 is a view for extracting a peak interval between a highest point and a lowest point extracted from a driving period divided from a mean period of a driving unit, FIG. 3 is a view for extracting a peak interval between a highest point and a lowest point from a mean period of a driving unit which is driven in real time, FIG. 4 is a view illustrating a numerical value of a peak interval illustrated in FIG. 3, FIG. 5 is a view for extracting a gradient value based on the peak interval illustrated in FIG. 4, FIG. 6 is a view for extracting an average gradient value of the peak interval between driving periods measured with an interval of unit times, FIG. 7 is a view for extracting a deviation value between a highest point and a lowest point in a repetitive driving period of a driving unit, FIG. 8 is a view for extracting a gradient value based on the deviation value illustrated in FIG. 7, FIG. 9 is a view for extracting an average gradient value of the deviation value between driving periods measured with an interval of unit times, FIG. 10 is a view for extracting a mean value by dividing a repetitive driving period of a driving unit into equal parts, FIG. 11 is a view for extracting a gradient value based on the mean value illustrated in FIG. 10, FIG. 12 is a view for extracting an average gradient value of a mean value between driving periods measured with an interval of unit times, FIG. 13 is a view for extracting a median value by dividing a repetitive driving period of a driving unit into equal parts, FIG. 14 is a view for extracting a gradient value based on the median value illustrated in FIG. 13, FIG. 15 is a view for extracting an average gradient value of a median value between driving periods measured with an interval of unit times, FIG. 16 is a view for detecting an abnormal state of a driving unit with a peak interval of a highest point and a lowest point of a driving period of a driving unit, FIG. 17 is a view for detecting an abnormal state of a driving unit with a deviation value of a highest point and a lowest point of a driving period of a driving unit, FIG. 18 is a view for detecting an abnormal state of a driving unit with a mean value of a driving period of a driving unit, and FIG. 19 is a view for detecting an abnormal state of a driving unit with a median value of a driving period of a driving unit.

As illustrated in FIG. 1, the precise predictive maintenance method 100 for a driving unit according to an embodiment of the present invention includes a first base information collecting step S10, a second base information collecting step S20, a setting step S30, and a detecting step S40.

The first base information collecting step S10 is a step of dividing change information of an energy size in accordance with a time measured in a normal driving state of a driving unit into a peak period and a mean period, forcibly dividing the mean period by a set time interval (ripple time) to set the divided period as a driving period, collecting a peak interval between a highest point of the driving period with a largest energy value and a lowest point with a smallest energy value, and connecting a peak interval of the driving period and a peak interval of repetitive another driving period to collect gradient information for the peak interval between the driving period.

Here, when a current consumed to operate the driving unit is assumed as the energy of the driving unit, generally, a high current is required at a timing of beginning the driving of the driving unit so that the energy size of the driving unit is formed to be maximum. Such a period is considered as a peak period. Further, when the driving unit is stabilized so that an energy value in a predetermined range is continuously maintained, the period may be considered as a mean period.

That is, as illustrated in FIG. 2, in the first base information collecting step S10, the mean period is forcibly divided by a set time interval to extract a plurality of driving periods, a peak interval between a highest point and a lowest point in the driving period is measured and collected and a gradient for the peak interval is measured by the peak interval between the highest point and the lowest point between the driving periods collected as described above, which will be described in detail below.

The precise predictive maintenance method 100 for a driving unit of the present disclosure forcibly extracts a plurality of driving periods from the mean period and collects and compares data between the driving periods to perform the predictive maintenance of the driving unit. Therefore, the precise predictive maintenance method is easily applicable to a driving unit which is continuously driven without being paused once it is driven.

The information collected as described above becomes a base of various alarm values set to detect an abnormal sign of the driving unit in the setting step S30 and the detecting step S40 which will be described below.

In the meantime, an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit, but is not limited thereto.

The second base information collecting step S20 is a step of connecting a peak interval between a highest point and a lowest point of the driving period in a driving state of the driving unit before the malfunction of the driving unit is generated and a peak interval of repetitive another driving period to collect gradient information of the peak interval between the driving periods.

The information collected as described above also becomes a base of various alarm values set to detect an abnormal sign of the driving unit in the setting step S30 and the detecting step S40 together with the information collected in the first base information collecting step S10.

The setting step S30 is a step of setting an alarm gradient value for the peak interval between the driving periods based on the gradient information collected in the base information collecting steps S10 and S20.

That is, the alarm gradient value for the peak interval between the highest point and the lowest point between the driving periods may also be set based on a value when a gradient value for a peak interval between the driving periods is abnormally changed before the malfunction of the driving unit is generated based on information collected in the base information collecting steps S10 and S20 for a long time, that is, a value when the gradient value for the peak interval between the driving periods is abnormally changed in a situation such as deterioration, aging of the driving unit or load due to the jamming of the foreign material.

In the detecting step S40, when an average gradient value for the peak interval between the driving periods measured with the interval of unit times set in the real-time driving state of the driving unit exceeds an alarm gradient value set in the setting step S30, the driving unit is detected to be an abnormal state and the unit time is set to include at least two driving periods.

That is, in the first base information collecting step S10, as illustrated in FIG. 3, the peak interval between the highest point and the lowest point is collected in repetitive driving periods of the mean period of the driving unit and the peak interval of each of the driving periods is represented in accordance with the time. For the convenience of description, when the repetitive driving periods are sequentially defined as a first driving period, a second driving period, ... and an n-th driving period, the peak interval may be represented as illustrated in FIG. 4.

Thereafter, as illustrated in FIG. 5, the peak intervals of the driving periods are connected to acquire a predetermined gradient value. The gradient value may be divided into a rising gradient value (positive) with a rising gradient and a falling gradient value (negative) with a falling gradient. However, both the gradient values are digitized into absolute values to be collected.

The information about the gradient value collected as described above is recognized as information indicating that the driving unit is stably driven in a normal state.

In the second base information collecting step S20, in the same manner as the first base information collecting step S10, the gradient information for the peak interval between the driving periods of the driving unit before the malfunction of the driving unit is generated is collected. In the setting step S30, an alarm gradient value for the peak interval between the driving periods is set based on the gradient information collected in the base information collecting steps S10 and S20.

Therefore, in the detecting step S40, as illustrated in FIG. 6, when an average gradient value obtained by connecting the peak intervals between the driving periods measured with the interval of unit times set in the real-time driving state of the driving unit exceeds the alarm gradient value set in the setting step S30, the driving unit is detected to be an abnormal state.

Here, the unit time is set in the setting step S30 to include at least two driving periods and may be set by several seconds as a smaller unit and also set by days, months, or years as a larger unit in consideration of the driving condition or surrounding environments of the driving unit.

Further, in the first base information collecting step S10, a deviation of the highest point energy value and the lowest point energy value of the driving period in the normal driving state of the driving unit is calculated to collect a deviation value of the driving period and the deviation value of the driving period and a deviation value of repetitive another driving period are connected to collect gradient information for the deviation value between the driving periods.

In the second base information collecting step S20, a deviation of the highest point energy value and the lowest point energy value of the driving period in the driving state of the driving unit before the malfunction of the driving unit is generated is calculated to collect a deviation value of the driving period and the deviation value of the driving period and a deviation value of repetitive another driving period are connected to collect gradient information for the deviation value between the driving periods.

In the setting step S30, an alarm gradient value for the deviation value between the driving periods is set based on the gradient information collected in the base information collecting steps S10 and S20.

In the detecting step S40, when an average gradient value for the deviation values between the driving periods measured with the interval of unit times set in the real-time driving state of the driving unit exceeds an alarm gradient value set in the setting step S30, the driving unit is detected to be an abnormal state and the unit time is set to include at least two driving periods.

That is, in the first base information collecting step S10, as illustrated in FIG. 7, the deviations between the highest point energy value and the lowest point energy value are collected in repetitive driving periods of the mean period of the driving unit and the deviation value of each of the driving periods is represented in accordance with the time. For the convenience of description, when the repetitive driving periods are sequentially defined as a first driving period, a second driving period, . . . and an n-th driving period, the deviation value may be represented as illustrated in FIG. 8.

Thereafter, as illustrated in FIG. 8, the extracted deviation values of the driving periods are connected to acquire a predetermined gradient value. The gradient value may be divided into a rising gradient value (positive) with a rising gradient and a falling gradient value (negative) with a falling gradient. However, both the gradient values are digitized into absolute values to be collected.

The information about the gradient value collected as described above is recognized as information indicating that the driving unit is stably driven in a normal state.

In the second base information collecting step S20, in the same manner as the first base information collecting step S10, the gradient information for the deviation values between the driving periods of the driving unit before the malfunction of the driving unit is generated is collected. In the setting step S30, an alarm gradient value for the deviation value between the driving periods is set based on the gradient information collected in the base information collecting steps S10 and S20.

Therefore, in the detecting step S40, as illustrated in FIG. 9, when an average gradient value obtained by connecting the deviation values between the driving periods measured with the interval of unit times set in the real-time driving state of the driving unit exceeds the alarm gradient value set in the setting step S30, the driving unit is detected to be an abnormal state.

Here, the unit time is set in the setting step S30 to include at least two driving periods and may be set by several seconds as a smaller unit and also set by days, months, or years as a larger unit in consideration of the driving condition or surrounding environments of the driving unit.

Further, in the first base information collecting step S10, a driving period in the normal driving state of the driving unit is divided into n equal parts by an arbitrary time interval and energy values of the equal parts are extracted and added to calculate a mean value and the mean value of the driving period and a mean value of repetitive another driving period are connected to collect gradient information for the mean value between driving periods.

In the second base information collecting step S20, a mean value of the driving period in the driving state of the driving unit before the malfunction of the driving unit is generated and a mean value of repetitive another driving period are connected to collect gradient information for the mean value between the driving periods.

In the setting step S30, an alarm gradient value for the mean value between the driving periods is set based on the gradient information collected in the base information collecting steps S10 and S20.

In the detecting step S40, when an average gradient value for the mean values between the driving periods measured with the interval of unit times set in the real-time driving state of the driving unit exceeds an alarm gradient value set in the setting step S30, the driving unit is detected to be an abnormal state and the unit time is set to include at least two driving periods.

That is, as illustrated in FIG. 10, in the first base information collecting step S10, the repetitive driving period of the mean period of the driving unit is divided into n equal parts by an arbitrary time interval and energy values of the equal parts are extracted and added to be averaged to extract a mean value of each of the driving periods. For the convenience of description, the driving periods are sequentially defined as a first driving period, a second driving period, . . . , an n-th driving period and each driving period is divided into 10 equal parts to extract a mean value.

Thereafter, as illustrated in FIG. 11, the extracted mean values of the driving periods are connected to acquire a predetermined gradient value. The gradient value may be divided into a rising gradient value (positive) with a rising gradient and a falling gradient value (negative) with a falling gradient. However, both the gradient values are digitized into absolute values to be collected.

The information about the gradient value collected as described above is recognized as information indicating that the driving unit is stably driven in a normal state.

In the second base information collecting step S20, in the same manner as the first base information collecting step S10, the gradient information for the mean values between the driving periods of the driving unit before the malfunction of the driving unit is generated is collected. In the setting step S30, an alarm gradient value for the mean value between the driving periods is set based on the gradient information collected in the base information collecting steps S10 and S20.

Therefore, in the detecting step S40, as illustrated in FIG. 12, when an average gradient value obtained by connecting the mean values between the driving periods measured with the interval of unit times set in the real-time driving state of the driving unit exceeds the alarm gradient value set in the setting step S30, the driving unit is detected to be an abnormal state.

Here, the unit time is set in the setting step S30 to include at least two driving periods and may be set by several seconds as a smaller unit and also set by days, months, or years as a larger unit in consideration of the driving condition or surrounding environments of the driving unit.

Further, in the first base information collecting step S10, a driving period in the normal driving state of the driving unit is divided into n equal parts by an arbitrary time interval and energy values of the equal parts are extracted and then the extracted energy values are listed in the order of size to set a value located in the middle as a median value, and the median value of the driving period and a median value of repetitive another driving period are connected to collect gradient information for the median value between driving periods.

In the second base information collecting step S20, a median value of the driving period in the driving state of the driving unit before the malfunction of the driving unit is generated and a median value of repetitive another driving period are connected to collect gradient information for the median value between the driving periods.

In the setting step S30, an alarm gradient value for the median value between the driving periods is set based on the gradient information collected in the base information collecting steps S10 and S20.

In the detecting step S40, when an average gradient value for the median values between the driving periods measured with the interval of unit times set in the real-time driving state of the driving unit exceeds an alarm gradient value set in the setting step S30, the driving unit is detected to be an abnormal state. In this case, when one value is obtained as the median value, the value is used as the median value and when two values are obtained, two values are added and averaged to be used as a median value and the unit time is set to include at least two driving periods.

That is, as illustrated in FIG. 13, in the first base information collecting step S10, the repetitive driving period of the mean period of the driving unit is divided into n equal parts by an arbitrary time interval and energy values of the equal parts are extracted. The extracted energy values are listed in the order of size to extract a value located in the middle as a median value. For the convenience of description, the driving periods are sequentially defined as a first driving period, a second driving period, . . . , an n-th driving period and each driving period is divided into 9 equal parts to extract a median value.

In this case, the reason why the diving period is divided into nine equal parts which are odd numbers is to easily extract a median value because when the driving period is divided by an arbitrary time interval to be listed in the order of size, there is one value located in the middle.

However, when the driving period may be divided into 10 equal parts which are even numbers, there are two values located in the middle so that two values are added and averaged to be used as a median value. For example, when values located in the middle are 4 and 6, 4 and 6 are added and averaged to obtain 5, which becomes a median value.

Thereafter, as illustrated in FIG. 14, the median values of the driving periods are connected to acquire a predetermined gradient value. The gradient value may be divided into a rising gradient value (positive) with a rising gradient and a falling gradient value (negative) with a falling gradient. However, both the gradient values are digitized into absolute values to be collected.

The information about the gradient value collected as described above is recognized as information indicating that the driving unit is stably driven in a normal state.

In the second base information collecting step S20, in the same manner as the first base information collecting step S10, the gradient information for the median value between the driving periods of the driving unit before the malfunction of the driving unit is generated is collected. In the setting step S30, an alarm gradient value for the median value between the driving periods is set based on the gradient information collected in the base information collecting steps S10 and S20.

Therefore, in the detecting step S40, as illustrated in FIG. 15, when an average gradient value obtained by connecting the median values between the driving periods measured with the interval of unit times set in the real-time driving state of the driving unit exceeds the alarm gradient value set in the setting step S30, the driving unit is detected to be an abnormal state.

Here, the unit time is set in the setting step S30 to include at least two driving periods and may be set by several seconds as a smaller unit and also set by days, months, or years as a larger unit in consideration of the driving condition or surrounding environments of the driving unit.

Further, in the first base information collecting step S10, a peak interval between a highest point and a lowest point measured in the driving period of the normal driving state of the driving unit, a deviation value, a mean value and a median value are collected.

In the second base information collecting step S20, a peak interval between a highest point and a lowest point measured in the driving period before the malfunction of the driving unit is generated, a deviation value, a mean value and a median value are collected.

In the setting step S30, alarm upper limits and alarm lower limits for the peak interval between the highest point and the lowest point, the deviation value, the mean value, and the median value are set based on the information collected in the base information collecting steps S10 and S20.

In the detecting step S40, when the peak interval between the highest point and the lowest point of the driving period of the change information of the energy size in accordance with the time measured in the real-time driving state of the driving unit, the deviation value, the mean value, and the median value exceed the alarm upper limit for the peak interval between the highest point and the lowest point, the mean value, and the median value set in the setting step S30 or is lower than the alarm lower limit, the driving unit is detected to be an abnormal state.

That is, as illustrated in FIGS. 16, 17, 18 and 19, during the process of driving the driving unit, when the peak interval between the highest point and the lowest point, the deviation value, the mean value, and the median value exceed the set alarm upper limit or is formed to be lower than the alarm lower limit, the driving unit is detected to be an abnormal state. Therefore, before the malfunction of the driving unit is generated, the driving unit is managed to be replaced or repaired in advance so that the economic loss to be caused by stopping the operation of the facilities due to the malfunction of the driving unit may be prevented in advance.

The precise predictive maintenance method 100 for a driving unit which detects an abnormal sign of the driving unit by the above-described processes measures and collects a peak interval, a mean value, and a median value between a highest point and a lowest point of a driving period from driving information of a driving unit in a normal state and driving information of the driving unit before a malfunction is generated and sets an alarm upper limit and an alarm lower limit and an alarm gradient value for the peak interval, the mean value, and the median value between the highest point and the lowest point based on the collected information to compare the peak interval, the mean value, and the median value between the highest point and the lowest point collected in real time by the driving of the driving unit, and a gradient value with the alarm upper limit, the alarm lower limit, and the alarm gradient value to issue an alarm when a suspected abnormal condition of the driving unit is satisfied and induce the driving unit to be repaired or replaced at a right time, thereby preventing a huge loss caused by the malfunction of the driving unit in advance.

Further, the precise predictive maintenance method presents various detection conditions in order to search for various abnormal signs which may occur in the driving unit and issues an alarm to the user when the detection conditions are satisfied, thereby not only easily detecting various abnormal signs generated in the driving unit, but also ensuring an excellent reliability for a detection result.

In the meantime, the precise predictive maintenance method 100 of the driving unit according to the embodiment of the present invention may also be implemented by a combination of various electronic devices and programs which are capable of collecting, detecting, comparing an energy value of the driving unit and issuing an alarm.

The present invention has been described with reference to the exemplary embodiment illustrated in the drawing, but the exemplary embodiment is only illustrative and the present invention is not limited thereto. Further, it would be appreciated by those skilled in the art that various modifications and equivalent exemplary embodiments may be made. Further, those skilled in the art may modify the present invention without departing from the spirit of the present invention. Accordingly, the scope of claiming the rights of the present invention is not defined within the scope of the detailed description, but may be limited by the following claims and the technical spirit thereof.

What is claimed is:

1. A precise predictive maintenance method for a driving unit, used for various facilities, the method comprising:
    a first base information collecting step S10 of dividing change information of an energy size in accordance with a time measured in a normal driving state of the driving unit into a peak period and a mean period, forcibly dividing the mean period by a set time interval to set a divided period as a driving period, collecting a peak interval between a highest point of the driving period with a largest energy value and a lowest point with a smallest energy value, and connecting a peak interval of the driving period and a peak interval between a highest point and a lowest point of repetitive another driving period to collect gradient information for the peak interval between the driving periods;
    a second base information collecting step S20 of connecting a peak interval between a highest point and a lowest point of a driving period in a driving state of the driving unit before a malfunction of the driving unit is generated and a peak interval between a highest point and a lowest point of repetitive another driving period to collect gradient information of the peak interval between the driving periods;
    a setting step S30 of setting an alarm gradient value for the peak interval between the driving periods based on the gradient information collected in the first and second base information collecting steps S10 and S20; and
    a detecting step S40 of detecting the driving unit to be an abnormal state when an average gradient value for the peak interval between the driving periods measured with an interval of unit times set in a real-time driving state of the driving unit exceeds the alarm gradient value set in the setting step S30,
    wherein the unit time is set to include at least two driving periods, and an energy measured by the driving unit is selected from any one of a current consumed to drive the driving unit, a vibration generated during the driving of the driving unit, a noise generated during the driving of the driving unit, a frequency of a power source of the driving unit, a temperature, a humidity, and a pressure of the driving unit during the driving of the driving unit.

2. The precise predictive maintenance method for the driving unit of claim 1, wherein:
    in the first base information collecting step S10, a deviation of a highest point energy value and a lowest point energy value of the driving period in the normal driving state of the driving unit is calculated to collect a deviation value of the driving period and the deviation value of the driving period and a deviation value of repetitive another driving period are connected to collect gradient information for the deviation value between the driving periods;
    in the second base information collecting step S20, a deviation of a highest point energy value and a lowest point energy value of the driving period in the driving state of the driving unit before the malfunction of the driving unit is generated is calculated to collect a deviation value of the driving period and the deviation value of the driving period and a deviation value of repetitive another driving period are connected to collect gradient information for the deviation value between the driving periods;
    in the setting step S30, an alarm gradient value for a deviation value between the driving periods is set based on the gradient information collected in the first and second base information collecting steps S10 and S20, and
    in the detecting step S40, when an average gradient value for the deviation value between the driving periods measured with the interval of unit times set in the real-time driving state of the driving unit exceeds the alarm gradient value for the deviation value between the driving periods set in the setting step S30, the driving unit is detected to be the abnormal state, and
    the unit time is set to include at least two driving periods.

3. The precise predictive maintenance method for the driving unit of claim 2, wherein:
    in the first base information collecting step S10, the driving period in the normal driving state of the driving unit is divided into n equal parts by an arbitrary time interval and energy values of the equal parts are extracted and added to calculate a mean value and the mean value of the driving period and a mean value of repetitive another driving period are connected to collect gradient information for the mean value between driving periods,
    in the second base information collecting step S20, a mean value of the driving period in the driving state of the driving unit before the malfunction of the driving unit is generated and a mean value of repetitive another driving period are connected to collect gradient information for the mean value between the driving periods,
    in the setting step S30, an alarm gradient value for the mean value between the driving periods is set based on the gradient information collected in the first and second base information collecting steps S10 and S20, and
    in the detecting step S40, when an average gradient value for the mean value between the driving periods measured with the interval of unit times set in the real-time driving state of the driving unit exceeds the alarm gradient value for the mean value between the driving periods set in the setting step S30, the driving unit is detected to be the abnormal state, and
    the unit time is set to include at least two driving periods.

4. The precise predictive maintenance method for the driving unit of claim 3, wherein:
    in the first base information collecting step S10, the driving period in the normal driving state of the driving unit is divided into n equal parts by an arbitrary time interval and energy values of the equal parts are extracted and then the extracted energy values are listed in the order of size to set a value located in the middle as a median value, and the median value of the driving period and a median value of repetitive another driving period are connected to collect gradient information for the median value between driving periods, in the second base information collecting step S20, a median value of the driving period in the driving state of the driving unit before the malfunction of the driving unit is generated and a median value of repetitive another driving period are connected to collect gradient information for the median value between the driving periods, in the setting step S30, an alarm gradient value for the median value between the driving periods is set based on the gradient information collected in the first and second base information collecting steps S10 and S20, and in the detecting step S40, when an average gradient value for the median value between the driving periods measured with the interval of unit times set in the real-time driving state of the driving unit exceeds the alarm gradient value for the median value between the driving periods set in the setting step S30, the driving unit is detected to be the abnormal state, and when one median value is obtained, the value is used as a median value and when two values are obtained, two values are added and averaged to be as a median value, and the unit time is set to include at least two driving periods.

5. The precise predictive maintenance method for the driving unit of claim 4, wherein:

in the first base information collecting step S10, a peak interval between a highest point and a lowest point measured in the driving period of the normal driving state of the driving unit, a deviation value, a mean value and a median value are collected, in the second base information collecting step S20, a peak interval between a highest point and a lowest point measured in the driving period before the malfunction of the driving unit is generated, a deviation value, a mean value and a median value are collected, in the setting step S30, alarm upper limits and alarm lower limits for the peak interval between the highest point and the lowest point, the deviation value, the mean value, and the median value are set based on the information collected in the first and second base information collecting steps S10 and S20, and in the detecting step S40, when the peak interval between the highest point and the lowest point of the driving period of the change information of the energy size in accordance with the time measured in the real-time driving state of the driving unit, the deviation value, the mean value, and the median value exceed the alarm upper limits for the peak interval between the highest point and the lowest point, the mean value, and the median value set in the setting step S30 or is lower than the alarm lower limits, the driving unit is detected to be the abnormal state.

\* \* \* \* \*